United States Patent
Rajput et al.

(10) Patent No.: US 11,627,467 B2
(45) Date of Patent: Apr. 11, 2023

(54) METHODS, SYSTEMS, AND COMPUTER READABLE MEDIA FOR GENERATING AND USING SINGLE-USE OAUTH 2.0 ACCESS TOKENS FOR SECURING SPECIFIC SERVICE-BASED ARCHITECTURE (SBA) INTERFACES

(71) Applicant: Oracle International Corporation, Redwood Shores, CA (US)

(72) Inventors: Jay Rajput, Bangalore (IN); Virendra Singh, Bangalore (IN); John Nirmal Mohan Raj, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/308,972

(22) Filed: May 5, 2021

(65) Prior Publication Data
US 2022/0360989 A1  Nov. 10, 2022

(51) Int. Cl.
*H04L 29/06* (2006.01)
*H04W 12/084* (2021.01)
(Continued)

(52) U.S. Cl.
CPC ......... *H04W 12/084* (2021.01); *H04L 9/0643* (2013.01); *H04L 63/0281* (2013.01)

(58) Field of Classification Search
CPC .... G06F 21/64; G06F 21/645; H04W 12/084; H04L 9/0643; H04L 63/0281; H04L 63/12; H04L 63/123; H04L 63/126
See application file for complete search history.

(56) References Cited

U.S. PATENT DOCUMENTS 1,872,857 A  8/1931  Wesson et al.
5,835,087 A  11/1998  Herz et al.
(Continued)

FOREIGN PATENT DOCUMENTS

CN  1964316  5/2007
CN  103039049 B  8/2016
(Continued)

OTHER PUBLICATIONS

Commonly-Assigned, co-pending U.S. Appl. No. 17/314,329 for "Methods, Systems, and Computer Readable Media for Protecting Against Mass Network Function (NF) Deregistration Attacks," (Unpublished, filed May 7, 2021).
(Continued)

*Primary Examiner* — Malcolm Cribbs
(74) *Attorney, Agent, or Firm* — Jenkins, Wilson, Taylor & Hunt, P.A.

(57) ABSTRACT

A method for obtaining and using a single-use OAuth 2.0 access token for securing specific service-based architecture (SBA) interfaces includes generating, by a consumer network function (NF) an access token request. The method further includes inserting, in the access token request, a hash of at least a portion of a service-based interface (SBI) request message. The method further includes sending the access token request to an NF repository function (NRF). The method further includes receiving, from the NRF, an access token response, the access token response having an OAuth 2.0 access token including the hash of the at least a portion of the SBI request message. The method further includes using the OAuth 2.0 access token including the hash of the at least a portion of the SBI request message to access an SBI service.

20 Claims, 15 Drawing Sheets

(51) Int. Cl.
*H04L 9/40* (2022.01)
*H04L 9/06* (2006.01)

(56) References Cited

U.S. PATENT DOCUMENTS

| | | |
|---|---|---|
| 6,185,612 B1 | 2/2001 | Jensen et al. |
| 6,298,383 B1 | 10/2001 | Gutman et al. |
| 7,266,837 B2 | 9/2007 | Monjas-Llorente et al. |
| 8,127,016 B2 | 2/2012 | Westman et al. |
| 8,171,032 B2 | 5/2012 | Herz |
| 8,218,459 B1 | 7/2012 | Stucker |
| 8,218,490 B2 | 7/2012 | Rydnell et al. |
| 8,626,157 B2 | 1/2014 | Nas et al. |
| 8,929,360 B2 | 1/2015 | Agarwal et al. |
| 9,094,819 B2 | 7/2015 | McCann et al. |
| 9,253,163 B2 | 2/2016 | Donovan |
| 9,967,148 B2 | 5/2018 | Goyal et al. |
| 10,033,736 B2 | 7/2018 | McCann |
| 10,547,613 B1 | 1/2020 | Roths et al. |
| 10,833,938 B1 | 11/2020 | Rajput et al. |
| 10,834,571 B1 | 11/2020 | Yau et al. |
| 11,558,737 B2 | 1/2023 | Rajput et al. |
| 11,570,689 B2 | 1/2023 | Rajput et al. |
| 2003/0227894 A1 | 12/2003 | Wang et al. |
| 2005/0235000 A1 | 10/2005 | Keil |
| 2006/0078119 A1 | 4/2006 | Jee et al. |
| 2006/0155871 A1 | 7/2006 | Ilkka et al. |
| 2006/0259759 A1 | 11/2006 | Maino et al. |
| 2007/0019616 A1 | 1/2007 | Rantapuska et al. |
| 2007/0250642 A1 | 10/2007 | Thubert et al. |
| 2007/0297419 A1 | 12/2007 | Askerup et al. |
| 2008/0010669 A1 | 1/2008 | Aittola et al. |
| 2008/0039104 A1 | 2/2008 | Gu et al. |
| 2009/0080440 A1 | 3/2009 | Balyan et al. |
| 2009/0165017 A1 | 6/2009 | Syed et al. |
| 2009/0232011 A1 | 9/2009 | Li et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0291923 A1 | 11/2010 | Zhou et al. |
| 2011/0165901 A1 | 7/2011 | Baniel et al. |
| 2011/0195710 A1 | 8/2011 | Nas et al. |
| 2011/0302244 A1 | 12/2011 | McCann et al. |
| 2012/0155389 A1 | 6/2012 | McNamee et al. |
| 2012/0157047 A1 | 6/2012 | Chen et al. |
| 2012/0158994 A1 | 6/2012 | McNamee et al. |
| 2012/0226814 A1 | 9/2012 | Stucker |
| 2013/0097418 A1 | 4/2013 | Bhatt et al. |
| 2013/0151845 A1 | 6/2013 | Donovan |
| 2013/0185767 A1 | 7/2013 | Tirupachur Comerica et al. |
| 2013/0290722 A1 | 10/2013 | Kall et al. |
| 2016/0352696 A1 | 12/2016 | Essigmann et al. |
| 2017/0012824 A1 | 1/2017 | Goyal et al. |
| 2017/0214691 A1 | 7/2017 | McCann |
| 2019/0260803 A1 | 8/2019 | Bykampadi et al. |
| 2020/0036754 A1 | 1/2020 | Livanos |
| 2020/0186359 A1* | 6/2020 | Chan ............... H04L 9/3273 |
| 2020/0245139 A1 | 7/2020 | Nakarmi et al. |
| 2021/0083965 A1 | 3/2021 | Taft et al. |
| 2021/0250172 A1 | 8/2021 | Choyi et al. |
| 2021/0288802 A1* | 9/2021 | Muhanna ............... H04L 9/3213 |
| 2021/0385286 A1 | 12/2021 | Wang et al. |
| 2022/0052992 A1 | 2/2022 | Zhang et al. |
| 2022/0124468 A1 | 4/2022 | Lu et al. |
| 2022/0225084 A1 | 7/2022 | Rajput et al. |
| 2022/0345486 A1 | 10/2022 | Rajput et al. |
| 2022/0360447 A1 | 11/2022 | Rajput et al. |
| 2022/0360991 A1 | 11/2022 | Rajput et al. |
| 2022/0361085 A1 | 11/2022 | Rajput et al. |

FOREIGN PATENT DOCUMENTS

| | | |
|---|---|---|
| CN | 111163473 A | 5/2020 |
| EP | 1 848 150 A1 | 10/2007 |
| EP | 1 873 980 A1 | 1/2008 |
| EP | 3 588 862 A1 | 1/2020 |
| KR | 10-1506232 | 3/2015 |
| WO | WO 2007/125498 A1 | 11/2007 |
| WO | WO 2011/156274 A2 | 12/2011 |
| WO | WO 2020/053481 A1 | 3/2020 |
| WO | WO 2022/043130 A1 | 3/2022 |
| WO | WO 2022/235373 A1 | 11/2022 |
| WO | WO 2022/235374 A1 | 11/2022 |
| WO | WO 2022/235463 A1 | 11/2022 |

OTHER PUBLICATIONS

Commonly-Assigned, co-pending U.S. Appl. No. 17/314,300 for "Methods, Systems, and Computer Readable Media for Hiding Network Function Instance Identifiers," (Unpublished, filed May 7, 2021).

Commonly-Assigned, co-pending U.S. Appl. No. 17/236,775 for "Methods, Systems, and Computer Readable Media for Mitigating Network Function (NF) Update and Deregister Attacks," (Unpublished, filed Apr. 21, 2021).

Commonly-Assigned, co-pending U.S. Appl. No. 17/145,143 for "Methods, Systems, and Computer Readable Media for Preventing Subscriber Identifier Leakage," (Unpublished, filed Jan. 8, 2021).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

"3rd Generation Partnership Project; Technical Specification Group Core Network and Terminals; 5G System; Authentication Server Services; Stage 3 (Release 16)," 3GPP TS 29,509, V16.5.0 pp. 1-60 (Sep. 2020).

Corrected Notice of Allowability for U.S. Appl. No. 15/003,647 (dated Jun. 28, 2018).

Communication pursuant to Article 94(3) EPC for European Patent Application Serial No. 11 792 956.2 (dated Apr. 23, 2018).

Notice of Allowance and Fee(s) Due for U.S. Appl. No. 15/003,647 (dated Mar. 7, 2018).

Notice of Allowance and Fee(s) Due for U.S. Appl. No. 14/795,601 (dated Dec. 28, 2017).

Applicant Initiated Interview Summary for U.S. Appl. No. 14/795,601 (dated Nov. 24, 2017).

Non-Final Office Action for U.S. Appl. No. 15/003,647 (dated Oct. 10, 2017).

Non-Final Office Action for U.S. Appl. No. 14/795,601 (dated Aug. 18, 2017).

Notification to grant a Chinese patent for Chinese Patent Application No. ZL201180032307.4 (dated Jun. 23, 2016).

Extended European Search Report for European Application No. 11792956.2 (dated Feb. 8, 2016).

Notification of the Third Office Action for Chinese Application No. 201180032307.4 (dated Jan. 25, 2016).

"RADIUS," https://en.wikipedia.org/wiki/RADIUS#Accounting, pp. 1-17 (Nov. 27, 2015).

Notice of Allowance for U.S. Appl. No. 13/712,481 dated Oct. 20, 2015.

Notice of Allowance for U.S. Appl. No. 13/712,481 dated Sep. 25, 2015.

Notification of the Second Office Action for Chinese Application No. 201180032307.4 (dated Jul. 17, 2015).

Commonly-Assigned, co-pending U.S. Appl. No. 14/795,601 for "Methods, Systems, and Computer Readable Media for Selective Diameter Topology Hiding," (Unpublished, filed Jul. 9, 2015).

Non-Final Office Action for U.S. Appl. No. 13/832,137 (dated Jun. 2, 2015).

(56) References Cited

OTHER PUBLICATIONS

Non-Final Office Action for U.S. Appl. No. 13/712,481 (dated Apr. 29, 2015).
Notice of Allowance for U.S. Appl. No. 13/154,119 dated Apr. 16, 2015.
Notice of Allowance and Applicant Initiated Interview Summary for U.S. Appl. No. 13/154,119 dated Mar. 17, 2015.
Advisory Action Before the Filing of an Appeal Brief for U.S. Appl. No. 13/712,481 (dated Mar. 11, 2015).
Email Regarding Decision to Grant for Korean Patent Application No. 2012-7034449 (dated Mar. 2, 2015).
Final Office Action for U.S. Appl. No. 13/712,481 (dated Dec. 3, 2014).
Notification of the First Office Action for Chinese Patent Application No. 201180032307.4 (dated Nov. 4, 2014).
Office Action for Korean Patent Application No. 2012-7034449 (dated Oct. 14, 2014).
Non-Final Office Action for U.S. Appl. No. 13/712,481 (dated May 8, 2014).
Notice of Preliminary Rejection for Korean Patent Application No. 2012-7034449 (dated Apr. 25, 2014).
Advisory Action for U.S. Appl. No. 13/154,119 dated Jan. 22, 2014.
Zhang et al., "TOHIP: A topology-hiding multipath routing protocol in mobile ad hoc networks," Ad Hoc Networks 21, pp. 109-122 (2014).
Final Office Action for U.S. Appl. No. 13/154,119 dated Oct. 25, 2013.
Notice of Allowance and Fee(s) Due for U.S. Appl. No. 13/021,402 (dated Sep. 9, 2013).
Non-Final Office Action for U.S. Appl. No. 13/154,119 dated May 2, 2013.
Communication of European publication No. and information on the application of Article 67(3) EPC for European Patent Application No. 11792956.2 (dated Mar. 13, 2013).
"EliteDSC—LTE Roaming," http://www.elitecore.com/telecompractices/lteroaming.html, pp. 1-2 (Copyright 2013).
Non-Final Office Action for U.S. Appl. No. 13/021,402 (dated Nov. 8, 2012).
Notification of Transmittal of the International Search Report and the Written Opinion of the International Searching Authority, or the Declaration for International Application No. PCT/US2011/039285 (dated Feb. 9, 2012).
Notification of Transmittal of the International Search Report and the Written Opinion of the International Searching Authority, or the Declaration for International Application No. PCT/US2011/023752 (dated Oct. 26, 2011).
"Topology Hiding," Chapter 13, Cisco Unified Border Element (SP Edition) Configuration Guide: Distributed Model, pp. 13-1-13-10 (Mar. 29, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).
Chiba et al., "Dynamic Authorization Extensions to Remote Authentication Dial in User Service (RADIUS)," RFC 5176, pp. 1-31 (Jan. 2008).
"Features—Kamailio (OpenSER) SIP Server," http://www.kamailio.org/w/features/, pp. 1-3 (Copyright 2008-2015).
Rouse, M., "Platform," searchservervirtualization.techtarget.com/definition/platform, pp. 1-2 (Sep. 2006).
Leach et al., "A Universally Unique IDentifier (UUID) URN Namespace," Network Working Group, RFC 4122, pp. 1-32 (Jul. 2005).
Calhoun et al., "Diameter Base Protocol," RFC 3588, pp. 1-147 (Sep. 2003).

Calhoun et al., "Diameter Base Protocol,"draft-ietf-aaa-diameter-07, Section 6.3, p. 68 (Jul. 2001).
Calhoun et al., "Diameter Base Protocol," The Internet Society, pp. 1-64 (Mar. 2001).
Rigney et al., "RADIUS Accounting," RFC 2866, pp. 1-28 (Jun. 2000).
Rigney et al., "Remote Authentication Dial in User Service (RADIUS)," RFC 2865, pp. 1-68 (Jun. 2000).
Farago et al., "Virtual path network topology optimization using random graphs," INFOCOM '99, 18th Annual Joint Conference of the IEEE Computer and Communications Societies, vol. 2, pp. 491-496 (Mar. 1999).
Goldschlag et al., "Hiding Routing Information," Springer Berlin Heidelberg, First International Workshop Cambridge, U.K., May 30-Jun. 1, 1996, Information Hiding Lecture Notes in Computer Science, vol. 1174, pp. 137-150 (1996).
"3rd Generation Partnership Project; Technical Specification Group Services and System Aspects; System architecture for the 5G System (5GS); Stage 2 (Release 17)," 3GPP TS 23.501 V17.0.0 (Mar. 2021).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Commonly-Assigned, co-pending U.S. Appl. No. 17/314,382 for "Methods, Systems, and Computer Readable Media for Single-Use Authentication Messages," (Unpublished, filed May 7, 2021).
Notification of Transmittal of the International Search Report and the Written Opinion of the International Searching Authority, or the Declaration for International Application No. PCT/US2022/026418 (dated Jul. 8, 2022).
Notification of Transmittal of the International Search Report and the Written Opinion of the International Searching Authority, or the Declaration for International Application No. PCT/US2022/026417 (dated Jul. 8, 2022).
Notification of Transmittal of the International Search Report and the Written Opinion of the International Searching Authority, or the Declaration for International Application No. PCT/US2022/023899 (dated Jul. 1, 2022).
Notice of Allowance and Fee(s) Due for U.S. Appl. No. 17/314,300 (dated Jun. 6, 2022).
Non-Final Office Action for U.S. Appl. No. 17/314,382 (dated May 23, 2022).
Non-Final Office Action for U.S. Appl. No. 17/145,143 (dated Mar. 15, 2022).
Notification of Transmittal of the International Search Report and the Written Opinion of the International Searching Authority, or the Declaration for U.S. Patent Application Serial No. PCT/US2021/064102 (dated Apr. 7, 2022).
Ericsson, "New Solution to KI#5: End-to-end integrity protection of HTTP body and method," 3GPP TSG-SA3 Meeting #102Bis-e, pp. 1-3 (Mar. 1-5, 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
Nokia et al., "Integrity protection of service request in indirect communication," 3GPP TSG-SA3, Meeting#100e, pp. 1-3 (Aug. 17-28, 2020).
"3rd Generation Partnership Project; Technical Specification Group Services and System Aspects; Security Aspects; Study on security aspects of the 5G Service Based Architecture (SBA) (Release 16)," 3GPP TR 33.855, V16.0.0, pp. 1-131 (Jul. 2020).
"5G; Security architecture and procedures for 5G System (3GPP TS 33.501 version 16.6.0 Release 16)," ETSI TS 133 501, V16.6.0, pp. 1-258 (Apr. 2021).

(56) References Cited

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

Hardt, "The OAuth 2.0 Authorization Framework", Internet Engineering Task Force (IETF) Request for Comments (RFC) 6749, pp. 1-76 (2012).

Commonly-assigned, co-pending U.S. Appl. No. 17/987,820 for "Methods, Systems, and Computer Readable Media for Detecting Stolen Access Tokens," (Unpublished, filed Nov. 15, 2022).

Housley et al. "Internet X.509 Public Key Infrastructure Certificate and CRL Profile," Network Working Group, Request for Comments: 2459, pp. 1-129 (Jan. 1999).

Jones et al., "JSON Web Token (JWT)," Internet Engineering Task Force (IETF), Request for Comments: 7519, pp. 1-30 (May 2015).

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

"3rd Generation Partnership Project; Technical Specification Group Services and System Aspects; Security architecture and procedures for 5G system (Release 17)," 3GPP TS 33.501, V17.7.0, pp. 1-292 (Sep. 2022).

Restriction Requirement for U.S. Appl. No. 17/314,329 (dated Nov. 7, 2022).

Final Office Action for U.S. Appl. No. 17/314,382 (dated Nov. 9, 2022).

Restriction Requirements for U.S. Appl. No. 17/314,329 (dated Nov. 7, 2022).

Notice of Allowance and Fee(s) Due for U.S. Appl. No. 17/314,300 (dated Sep. 27, 2022).

Notice of Allowance and Fee(s) Due and Examiner-Initiated Interview Summary for U.S. Appl. No. 17/145,143 (dated Sep. 2, 2022).

Notice of Allowance and Fee(s) Due and Examiner-Initiated Interview Summary for U.S. Appl. No. 17/145,143 (dated Aug. 11, 2022).

Notification of Transmittal of the International Search Report and the Written Opinion of the International Searching Authority, or the Declaration for International Application No. PCT/US2022/023894 (dated Aug. 1, 2022).

"3rd Generation Partnership Project; Technical Specification Group Services and System Aspects; Study on Enhancements to the Service-Based Architecture (Release 16)," 3GPP TR 23.742, V1.0.0, pp. 1-101 (Sep. 2018).

Notice of Allowance and Fee(s) Due for U.S. Appl. No. 17/314,382 (dated Feb. 16, 2023).

\* cited by examiner

FIG. 4

METHODS, SYSTEMS, AND COMPUTER READABLE MEDIA FOR GENERATING AND USING SINGLE-USE OAUTH 2.0 ACCESS TOKENS FOR SECURING SPECIFIC SERVICE-BASED ARCHITECTURE (SBA) INTERFACES

TECHNICAL FIELD

The subject matter described herein relates to security in telecommunications networks. More particularly, the subject matter described herein relates to methods, systems, and computer readable media for generating and using single-use OAuth 2.0 access tokens for securing specific SBA interfaces.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks relates to security for specific service-based architecture (SBA) interfaces. The current security procedure defined in 3GPP TS 33.501 for accessing SBA interfaces is referred to as service access authorization. The messages used to access SBA interfaces are referred to as service-based interface (SBI) messages, and the services provided on the interfaces are referred to as SBI services. According to the service access authorization procedure, a consumer NF seeking to access an SBI service provided by a producer NF must obtain an OAuth 2.0 access token from the NRF. To obtain the OAuth 2.0 access token from the NRF, the consumer NF sends an access token request to the NRF. The NRF validates the request, generates an access token, and returns the access token to the consumer NF. When the consumer NF seeks to access the service, the consumer NF sends an SBI service request message to the producer NF. The SBI service request message includes the access token obtained from the NRF. The producer NF verifies the integrity of the claims in the access token and, if the claims are valid, the producer NF provides access to the requested service.

One problem with this architecture is that the access token can be stolen and used by hackers to obtain services from producer NFs without authorization and/or implement denial of service attacks. Even though an access token has an expiration time, because the access token can be re-used, a hacker who obtains the access token can use the access token maliciously to access SBI services before the expiration time.

In light of these and other difficulties, there exists a need for a methods, improved methods, systems, and securing specific SBA interfaces.

SUMMARY

A method for obtaining and using a single-use OAuth 2.0 access token for securing specific service-based architecture (SBA) interfaces includes generating, by a consumer network function (NF) an access token request. The method further includes inserting, in the access token request, a hash of at least a portion of a service-based interface (SBI) request message. The method further includes sending the access token request to an NF repository function (NRF). The method further includes receiving, from the NRF, an access token response, the access token response including the hash of the at least a portion of the SBI request message. The method further includes using the OAuth 2.0 access token including the hash of the at least a portion of the SBI request message to access an SBI service.

According to another aspect of the subject matter described herein, including the hash of the at least a portion of the SBI request in the access token request includes adding the hash of the at least a portion of the SBI request as a custom hypertext transfer protocol (HTTP) header or a vendor-specific information element (IE) in a JavaScript object notation (JSON) body of the access token request.

According to another aspect of the subject matter described herein, receiving the access token response having the OAuth 2.0 access token including the hash of the at least a portion of the SBI request includes receiving the access token response with the hash of the at least a portion of the SBI request as a claim of the OAuth 2.0 access token.

According to another aspect of the subject matter described herein, using the OAuth 2.0 access token including the hash of the at least a portion of the SBI request message to access the SBI service includes transmitting the SBI request message with the OAuth 2.0 access token including the hash of the at least a portion of the SBI request message to a producer NF.

According to another aspect of the subject matter described herein, transmitting the SBI request message with the OAuth 2.0 access token including the hash of the at least a portion of the SBI request message to the producer NF includes transmitting the SBI request message to the producer NF via a proxy NF.

According to another aspect of the subject matter described herein, the method for obtaining and using a single-use OAuth 2.0 access token for securing specific service-based architecture (SBA) includes, at the proxy NF, receiving the SBI request message, generating a hash of the at least a portion of the SBI request message, comparing the hash of the at least a portion of the SBI request message generated by the proxy NF with the hash of the at least a portion of the SBI request message included in the OAuth 2.0 access token and validating or rejecting the SBI request message based on results of the comparing.

According to another aspect of the subject matter described herein, the proxy NF comprises one of a service communication proxy (SCP) and a security edge protection proxy (SEPP).

According to another aspect of the subject matter described herein, the method for obtaining and using a single-use OAuth 2.0 access token for securing specific service-based architecture (SBA) interfaces includes, at the producer NF, receiving the SBI request message, generating a hash of the at least a portion of the SBI request message, comparing the hash of the at least a portion of the SBI request message generated by the producer NF with the hash of the at least a portion of the SBI request message included in the OAuth 2.0 access token and validating or rejecting the SBI request message based on results of the comparing.

According to another aspect of the subject matter described herein, a system for obtaining and using a single-use OAuth 2.0 access token for securing specific service-based architecture (SBA) interfaces, is provided. The system includes a consumer network function (NF) including at least one processor. The system further includes a single-use OAuth 2.0 access token requestor implemented by the at least one processor for generating an access token request, including, in the access token request, a hash of at least a portion of a service-based interface (SBI) request message, sending the access token request to an NF repository function (NRF), and receiving, from the NRF, an access token response, the access token response having an OAuth 2.0 access token including the hash of the at least a portion of the SBI request message. The system further includes a secure SBI request message generator implemented by the at least one processor for using the OAuth 2.0 access token including the hash of the at least a portion of the SBI request message to access an SBI service.

According to another aspect of the subject matter described herein, the single-use OAuth 2.0 access token requestor is configured to add the hash of the at least a portion of the SBI request as a custom hypertext transfer protocol (HTTP) header or a vendor-specific information element (IE) in a JavaScript object notation (JSON) body of the access token request.

According to another aspect of the subject matter described herein, the single-use OAuth 2.0 access token requestor is configured to receive the access token response with the hash of the at least a portion of the SBI request as a claim of the OAuth 2.0 access token.

According to another aspect of the subject matter described herein, the secure SBI request message generator is configured to use the OAuth 2.0 access including the hash of the at least a portion of the SBI request message to access the service by transmitting the SBI request message with the OAuth 2.0 access token including the hash of the at least a portion of the SBI request message to a producer NF.

According to another aspect of the subject matter described herein, the system for obtaining and using a single-use OAuth 2.0 access token for securing specific service-based architecture (SBA) interfaces includes a proxy NF, wherein the SBI request message generator is configured to transmit the SBI request message with the OAuth 2.0 access token including the hash of the at least a portion of the SBI request message to the producer NF via the proxy NF.

According to another aspect of the subject matter described herein, the proxy NF is configured to receive the SBI request message, generate a hash of the at least a portion of the SBI request message, compare the hash of the at least a portion of the SBI request message generated by the proxy NF with the hash of the at least a portion of the SBI request message included in the OAuth 2.0 access token and validate or reject the SBI request message based on results of the comparing.

According to another aspect of the subject matter described herein, the proxy NF comprises one of a service communication proxy (SCP) or a security edge protection proxy (SEPP).

According to another aspect of the subject matter described herein, for obtaining and using a single-use OAuth 2.0 access token for securing specific service-based architecture (SBA) interfaces includes a producer NF, wherein the SBI request message generator is configured to use the OAuth 2.0 access token including the hash of the at least a portion of the SBI request message to access an SBI service by transmitting the SBI request message to the producer NF and wherein the producer NF is configured to receive the SBI request message, generate a hash of the at least a portion of the SBI request message, compare the hash of the at least a portion of the SBI request message generated by the producer NF with the hash of the at least a portion of the SBI request message included in the OAuth 2.0 access token and validate or reject the SBI request message based on results of the comparing.

According to another aspect of the subject matter described herein, a system for generating and distributing a single-use OAuth 2.0 access token for securing specific service-based architecture (SBA) interfaces is provided. The system incudes a network function (NF) repository function including at least one processor. The system further includes an access token request handler implemented by the at least one processor for receiving, from a requestor, an access token request message including a hash of at least a portion of a service-based interface (SBI) request message, generating an access token response message including an OAuth 2.0 access token, including, in the OAuth 2.0 access token, the hash of the at least a portion of the SBI request message, and transmitting the access token response message to the requestor.

According to another aspect of the subject matter described herein, a system for using a single-use OAuth 2.0 access token to secure specific service-based architecture (SBA) interfaces is provided. The system includes a network function (NF) including at least one processor. The system further includes a service-based interface (SBI) request message validator implemented by the at least one processor for receiving an SBI request message including an OAuth2.0 access token having an SBI request message hash, generating a hash of at least a portion of the SBI request message, comparing the hash of the at least a portion of the SBI request message generated by the proxy NF to the SBI request message hash included in the OAuth 2.0 access token and validating or rejecting the SBI request message based on results of the comparing.

According to another aspect of the subject matter described herein, the NF comprises a proxy NF.

According to another aspect of the subject matter described herein, the NF comprises a producer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which:

FIG. 4 is a diagram created using the debugger available at https://jwt.io illustrating an exemplary format for an OAuth 2.0 access token;

DETAILED DESCRIPTION

Figure 1:
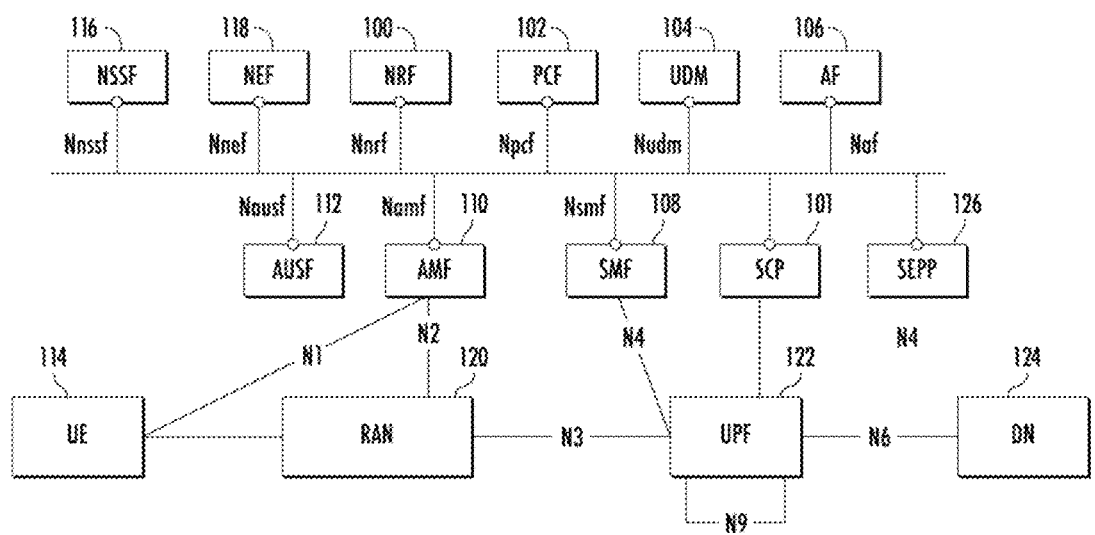
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem with security in 5G and subsequent generation networks is that 3GPP TS 33.501 suggests the use of the OAuth 2.0 framework for authorization, and an OAuth 2.0 access token issued by the NRF can be used multiple times before expiration. Because the access token can be used multiple times, it can be misused by a hacker if stolen. 3GPP TS 33.501 does not provide any mitigation against stolen OAuth 2.0 access token attacks. The subject matter described herein includes an OAuth 2.0 access token that is made "single use" by carrying an SBI message hash field, which is validated by proxies (SCPs or SEPPs) or producer NFs, on selected SBA interfaces to protect against stolen OAuth 2.0 access token attacks.

Figure 2:
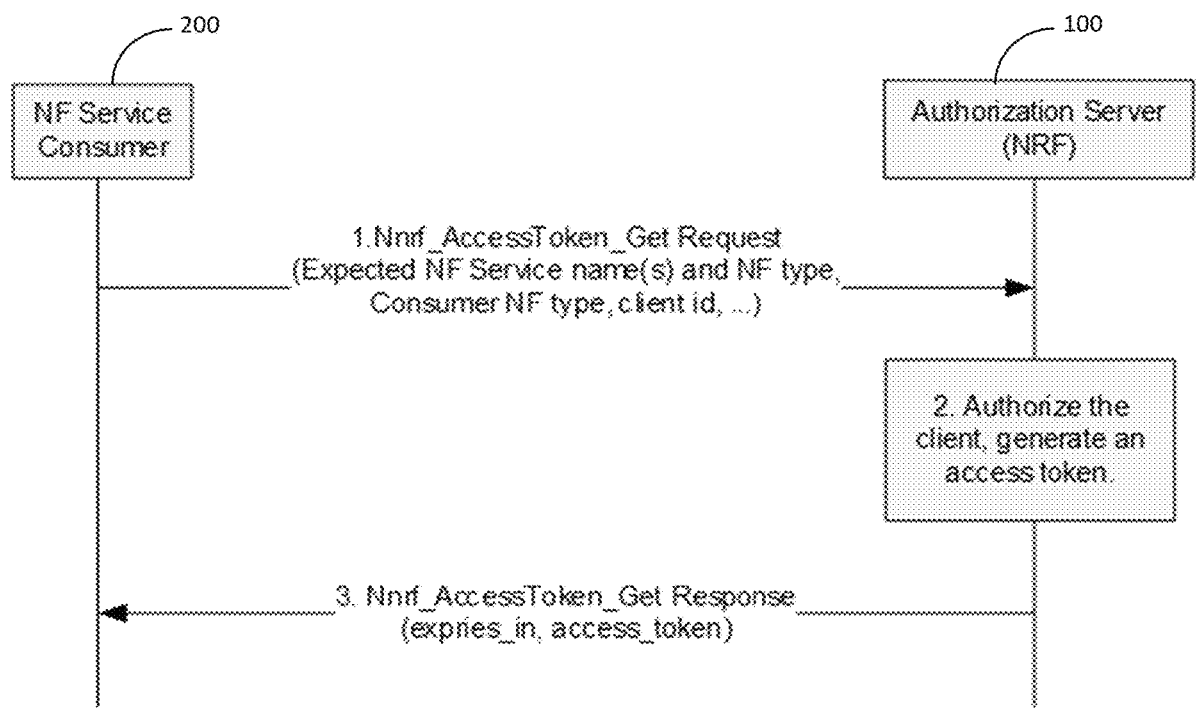
FIG. 2 is a message flow diagram illustrating exemplary messages exchanged for obtaining an access token from an NRF.

Section 13.4 of 3GPP TS 33.501 defines the service access token authorization procedure. FIG. 2 is a message flow diagram illustrating exemplary messages exchanged for obtaining an access token from an NRF. Referring to FIG. 2, in step 1 of the message flow diagram, NF service consumer 200 sends and Nnrf_AccessToken_Get request message to the OAuth 2.0 authorization server, which in the context of 3GPP TS 33.501, is NRF 100. The Nnrf_AccessToken_Get request message includes the expected service names, the producer NF type, the consumer NF type, the client ID, and other parameters. In step 2 of the message flow diagram, NRF 100 authorizes the client and generates an OAuth 2.0 access token. In line 3 of the message flow diagram, NRF 100 sends the access token to NF service consumer 200 in an Nnrf_AccessToken_Get response. The access token includes an expiration time. However, the access token can still be stolen and reused prior to the expiration time.

Figure 3:
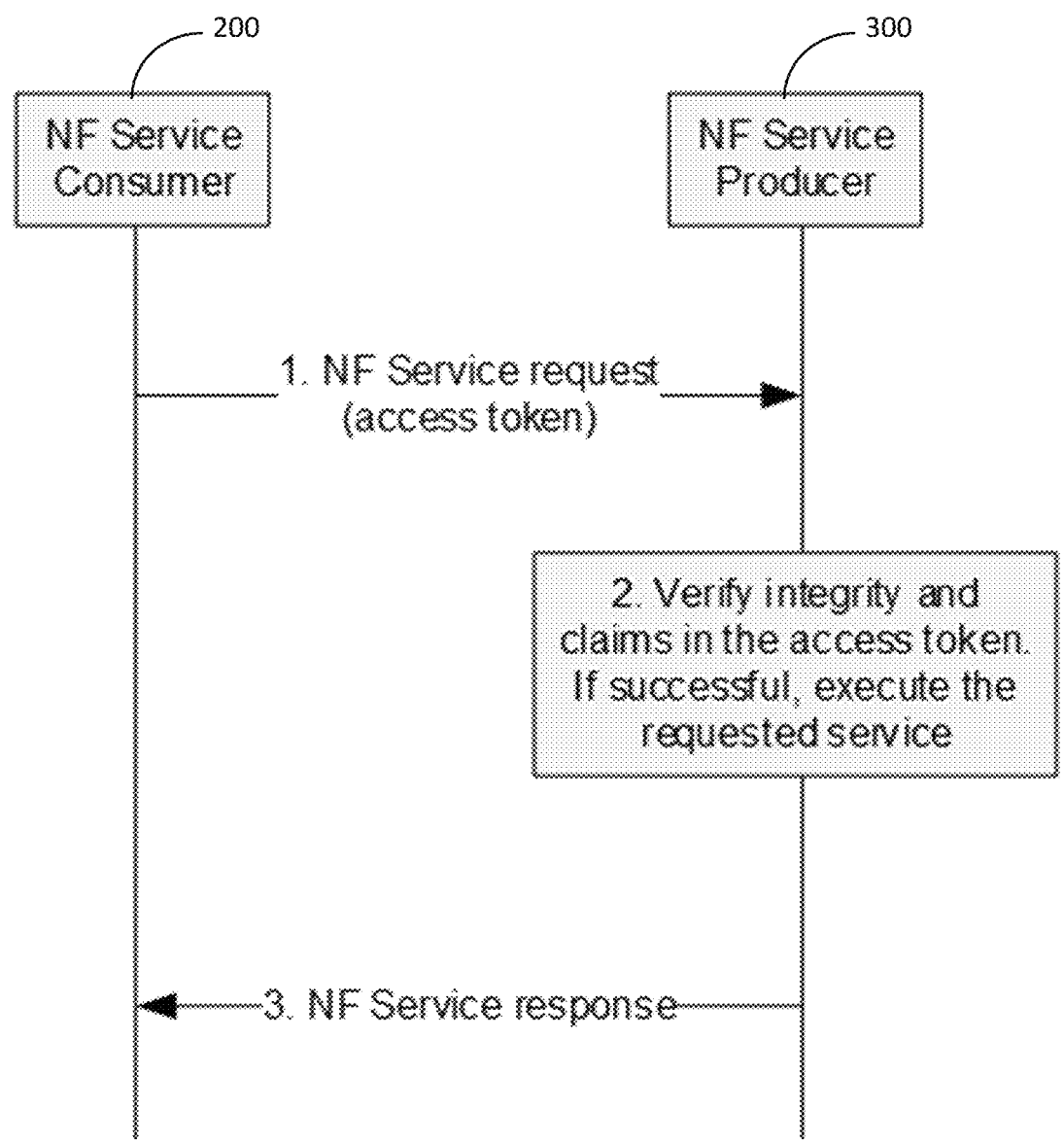
FIG. 3 is a message flow diagram illustrating exemplary messages exchanged in using an access token to access an SBI service.

FIG. 3 is a message flow diagram illustrating the use of the access token obtained in FIG. 1 to access a service provided by a producer NF. Referring to FIG. 3, in step 1, NF service consumer 200 sends an NF service request to an NF service producer 300. The NF service request includes the access token obtained from the NRF using the steps illustrated in FIG. 2. In step 2 of the message flow diagram, NF service producer 300 verifies the integrity and claims in the access token and, if successful, executes or provides the requested service. In step 3 of the message flow diagram, NF service producer 300 sends an NF service response to NF service producer 200. Thus, FIG. 3 illustrates that as long as the access token has valid claims, an NF service consumer or a hacker with a stolen access token can access the service provided by the NF service producer. It should be noted that the access token in FIG. 3 can used with multiple different SBI request messages and is not specific to an SBI request message or message type.

FIG. 4 is a diagram illustrating an example of an OAuth 2.0 access token in encoded and decoded form. More particularly, the left hand pane in FIG. 4 illustrates the encoded form of the OAuth 2.0 access token. The right hand pane illustrates the decoded form of the OAuth 2.0 access token. The token in encoded form is used in the HTTP header when making the service access request by the consumer NF. The OAuth 2.0 access token is signed with the private key of the NRF and can be verified using the public key of the NRF.

Table 1 shown below illustrates attributes, which are referred to as claims, that are included in an OAuth 2.0 access token. The complete claims data structure for the OAuth 2.0 access token is defined in Table 6.3.5.2.4-1 of 3GPP TS 29.510.

TABLE 1

OAuth 2.0 Access Token Claims

| Attribute Name | Description |
| --- | --- |
| iss | Issuer NRF NF Instance Id |
| sub | Consumer NF Instance Id |
| aud | Producer(s) details |
| scope | Producer Service Names, resource/operation-level scopes |
| exp | Expiration Time |
| consumerPlmnId | Consumer PlmnId |
| producerPlmnId | Producer PlmnId |
| producerSnssailist | Array(Snssai) |
| producerNsiList | Array(string) |
| producerNFSetId | ProducerNfSetId |

From Table 1, the OAuth 2.0 access token includes various claims that identify the issuing NRF, the producer NF, the expiration time, the consumer PLMN, the producer PLMN, producer network slice identifying information, and producer NF set identifying information. However, there is no claim in the defined format for the OAuth 2.0 access token that prevents a hacker from stealing the access token and using the access token to gain unauthorized access to a service provided by a producer NF.

The following is an example of access token claims that may be carried in encoded text format in an OAuth 2.0 access token for an AMF:

```
"iss": "6faf1bbc-6e4a-4454-a507-a14ef8e1bc5c",
"sub": "6faf1bbc-6e4a-4454-a507-a14ef8e1dc5d",
"aud": [
    "6faf1bbc-6e4a-4454-a507-b14ef8e1bc4c"
],
"scope": "namf-mt",
"exp": 1586169019
}
```

In the illustrated example the access token claims include the issuer NF instance ID, the consumer NF instance ID, producer NF details, the scope of the token, and an expiration time. However, as indicated above, a hacker can copy the OAuth 2.0 access token claims and use the access token to access a service provided by a producer NF and/or to initiate a denial of service attack on the producer NF.

As stated above 3GPP TS 33.501 suggests using the OAuth 2.0 access token for authorization for SBI communication. A hacker having access to a stolen OAuth 2.0 access token can use the stolen access token to invoke SBI messages in the network. The existing expiration time field in the OAuth 2.0 access token does not protect against a stolen token attack. The expiration field makes the attack harder or limits the time period during which an attack can occur. Reducing the expiration time does not guarantee that misuse cannot occur. There is a need to mitigate against a stolen OAuth 2.0 access token attack. It should also be noted that not all SBI APIs are equal in terms of security and performance. Some APIs need to be highly secure (e.g., NFUpdate and NFDeregister APIs); whereas for other APIs, network operators may choose performance over security. There is always a tradeoff between security and performance.

Figure 5:
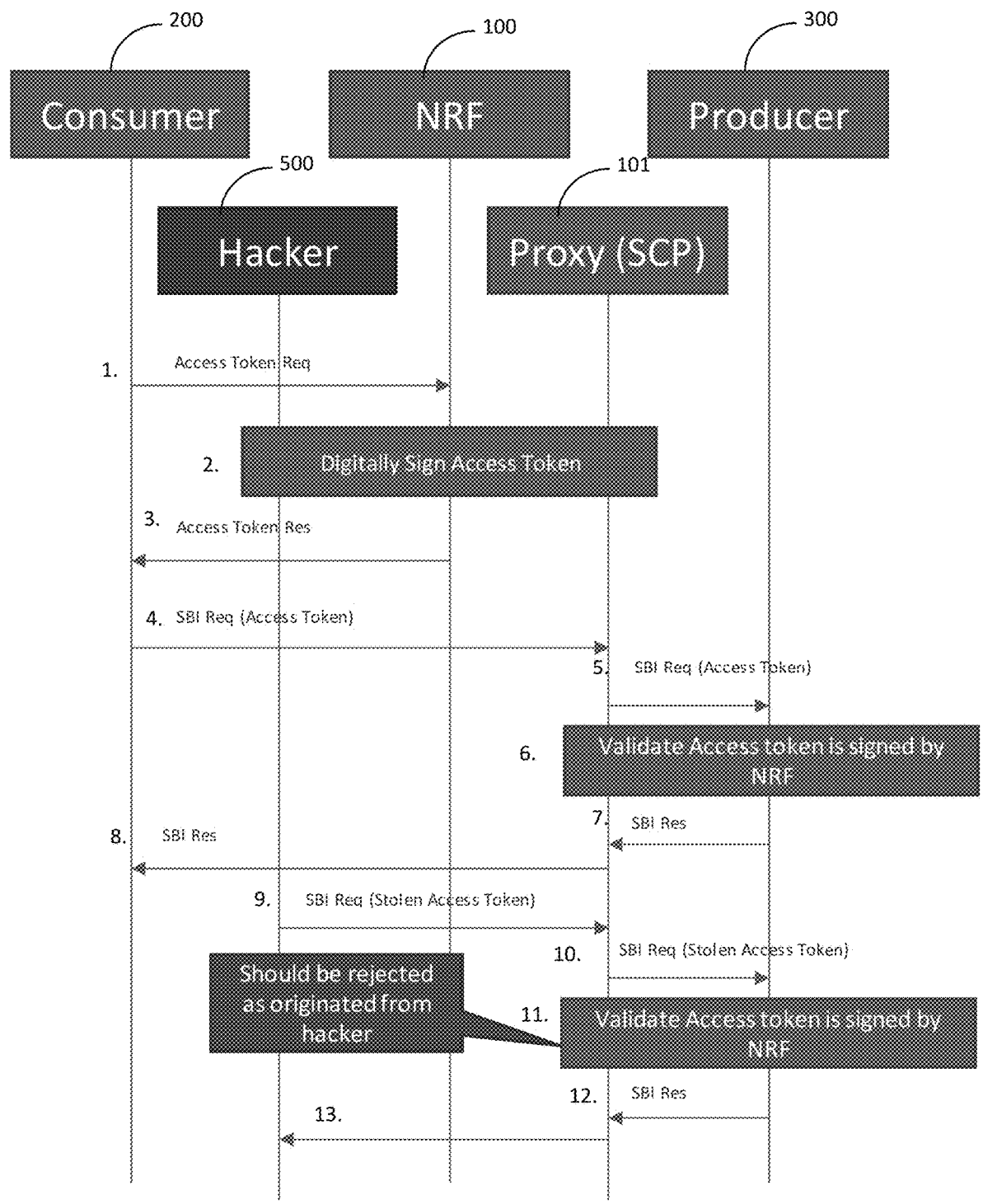
FIG. 5 is a message flow diagram illustrating a hacker using a stolen OAuth 2.0 access token to access a service.

FIG. 5 is a message flow diagram illustrating both the legitimate and illegitimate use of an OAuth 2.0 access token to access a service provided by a producer NF. Referring to FIG. 5, in step 1, consumer NF 200 sends an access token request to NRF 100. NRF 100 receives the request, validates the consumer NF, generates an OAuth 2.0 access token, and, in step 2, digitally signs the OAuth 2.0 access token. In step 3, NRF 100 sends the digitally signed access token to consumer NF 200 in an access token response message.

In step 4 of the message flow diagram consumer NF 200 sends an SBI request message to producer NF 300 via proxy 101. In step 5, proxy 101 forwards the SBI request including the access token to producer NF 300. In step 6, producer NF 300 validates that the access token is signed by the NRF and grants access to the requested service. In step 7, producer NF 300 sends an SBI response to consumer NF 200 via proxy 101. In step 8, proxy 101 sends the SBI response to consumer NF 200.

In step 9 of the message flow diagram, hacker 500 sends an SBI request to producer NF 300 via proxy 101. The SBI request includes a stolen access token. In step 10, proxy 101 routes the SBI request including the stolen access token to producer NF 300. In step 11, producer NF 300 validates that the access token is signed by the NRF. However, no further validation is performed. The message should be rejected as originating from a hacker but it is not. Producer NF 300 provides access to the requested service. In step 12, producer NF 300 sends and SBI response to hacker 500 via proxy 101. In step 13, proxy 101 forwards the SBI response to hacker 500. Thus, FIG. 5 illustrates the case where a stolen access token is used by a hacker to obtain unauthorized access to a service provided by a producer NF.

The scenario illustrated in FIG. 5 can be avoided by creating OAuth 2.0 access token which can be used only once, so even if the OAuth 2.0 access token is stolen, it cannot be misused. To make sure that the OAuth 2.0 access token can be used only once, the subject matter described herein includes adding an SBI message (HTTP header+ Body) hash to the OAuth 2.0 access token. Adding the SBI message hash to the OAuth 2.0 access token makes the OAuth2.0 access token specific to the SBI message such that the OAuth2.0 access token cannot be used with an SBI message having different parameters than those used to create the hash. As a result, a consumer NF may be required to obtain a new OAuth 2.0 access token each time the consumer NF wishes to access an interface that uses single-use OAuth2.0 access token validation, which decreases performance on protected interfaces. However, the tradeoff for the decrease in performance is enhanced security.

Care should be taken when creating SBI message hash. Any header or body attribute which is allowed to be modified by proxies shall be excluded when creating the hash. For example the authority header shall not be part of the SBI message hash as the authority header can be updated by an SCP for alternate routing. Adding the SBI message hash to the OAuth 2.0 access token ensures that the OAuth 2.0 access token can be used only once with the given SBI message whose parameters where used to create the hash.

Single-use OAuth 2.0access token validation can be performed either at proxies (SCP/SEPP) or at producer NFs, depending on the operator policies. Single-use OAuth 2.0 access token validation can be selectively enabled or disabled based on the SBI. For example: operator may choose to enable single-use OAuth 2.0 access token validation for an API which needs high security, but not for other APIs.

According to the single-use OAuth 2.0 access token validation mechanism described herein, a consumer NF creates an SBI request hash and sends the hash to NRF in the access token request message. The SBI request hash, in one example, is sent in a custom HTTP header of the access token request message. In an alternate example, the SBI request hash may be included as a vendor-specific information element (IE) in the JavaScript object notation (JSON) body of the access token request. The NRF adds the SBI request hash received from the consumer NF as a 3gppsbi-reqhash field (claim) to the access token and sends access token to the consumer NF. The consumer NF sends an SBI request with the access token to the producer NF via a proxy or directly to the producer NF without passing through a proxy. The producer NF or proxy validates that the access token was signed by the NRF. The producer NF or proxy validates that the SBI request hash matches with the 3gppsbireqhash field of the access token. If a hacker tries to send an SBI request with a stolen access token to the producer NF, the producer NF or proxy rejects the request from the hacker, as the SBI request hash will not match the 3gppsbireqhash field of the access token.

Figure 6:
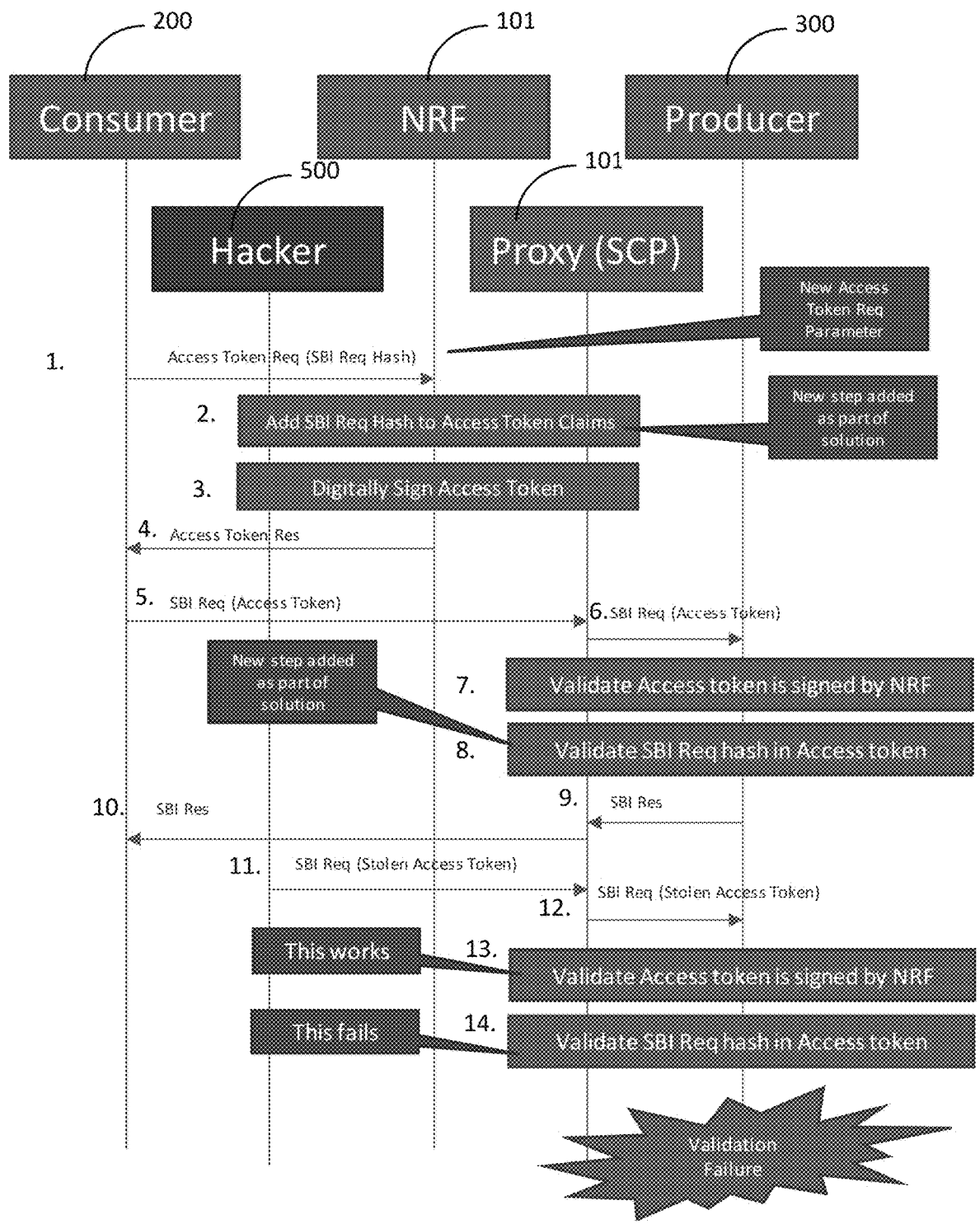
FIG. 6 is a message flow diagram illustrating exemplary messages exchanged for using a single-use OAuth 2.0 access token to secure an SBI service where access token validation is performed at a producer NF.

FIG. 6 illustrates the case where a single-use OAuth 2.0 access token is generated and used by a producer NF to validate SBI requests from legitimate consumer NFs and reject SBI requests from attackers. Referring to FIG. 6, in step 1, consumer NF 200 sends an access token request to NRF 100. The access token request includes a hash of at least a portion of an SBI request message that consumer NF 200 intends to send to a producer NF. The hash may be generated using parameters of the SBI request that are not changed by intermediate nodes so that the hash can be verified by the producer NF. In step 2 of the message flow diagram, NRF 100 receives the access token request and locates, in its NF profile database, an OAuth 2.0 access token corresponding to the producer NF identified in the access token request. NRF 100 adds the hash of the portion of the SBI request message to the access token as a claim. This is a step that is not performed in conventional OAuth 2.0 access token generation. In step 3, NRF 100 digitally signs the access token, including the hash of the portion of the SBI request message. In step 4 of the message flow diagram, NRF 100 sends an access token response to consumer NF 200. The access token response includes the digitally signed access token, which includes the hash of the SBI request message as a claim.

In step 5 of the message flow diagram, consumer NF 200 sends an SBI request to producer NF 300 via proxy 101. The SBI request includes the access token. In step 6, proxy 101 forwards the SBI request to producer NF 300. In step 7, producer NF 300 verifies that the access token is signed by the NRF. In step 8, producer NF 300 validates the SBI request hash in the access token. Validating the SBI request hash in the access token may include computing a hash of a portion of the SBI request message and comparing the computed hash to the hash that is included as a claim in the access token. In this example it is assumed that the computed hash matches the hash that is included in the claim of the access token. Accordingly, in step 9, producer NF 300 sends an SBI response message to consumer NF 200 via proxy 101. In step 10, proxy 101 forwards the SBI response message to consumer NF 200.

In step 11, hacker 500 launches an attack against producer NF 300 using a stolen access token. In step 12, proxy 101 forwards the SBI request from hacker 500 to producer NF 300. In step 13, producer NF 300 validates that the access token is signed by the NRF. The validation in step 13 passes because the stolen access token was signed by the NRF. In step 14, producer NF 300 attempts to validate the SBI request hash in the access token. However, because the SBI request parameters used to generate the hash are different from those in the SBI request message generated by hacker 500, the hash computed by producer NF 300 does not match the hash stored as a claim in the access token. Accordingly, in step 15, validation fails, and hacker 500 is prevented from accessing the service provided by producer NF 300.

Figure 7:
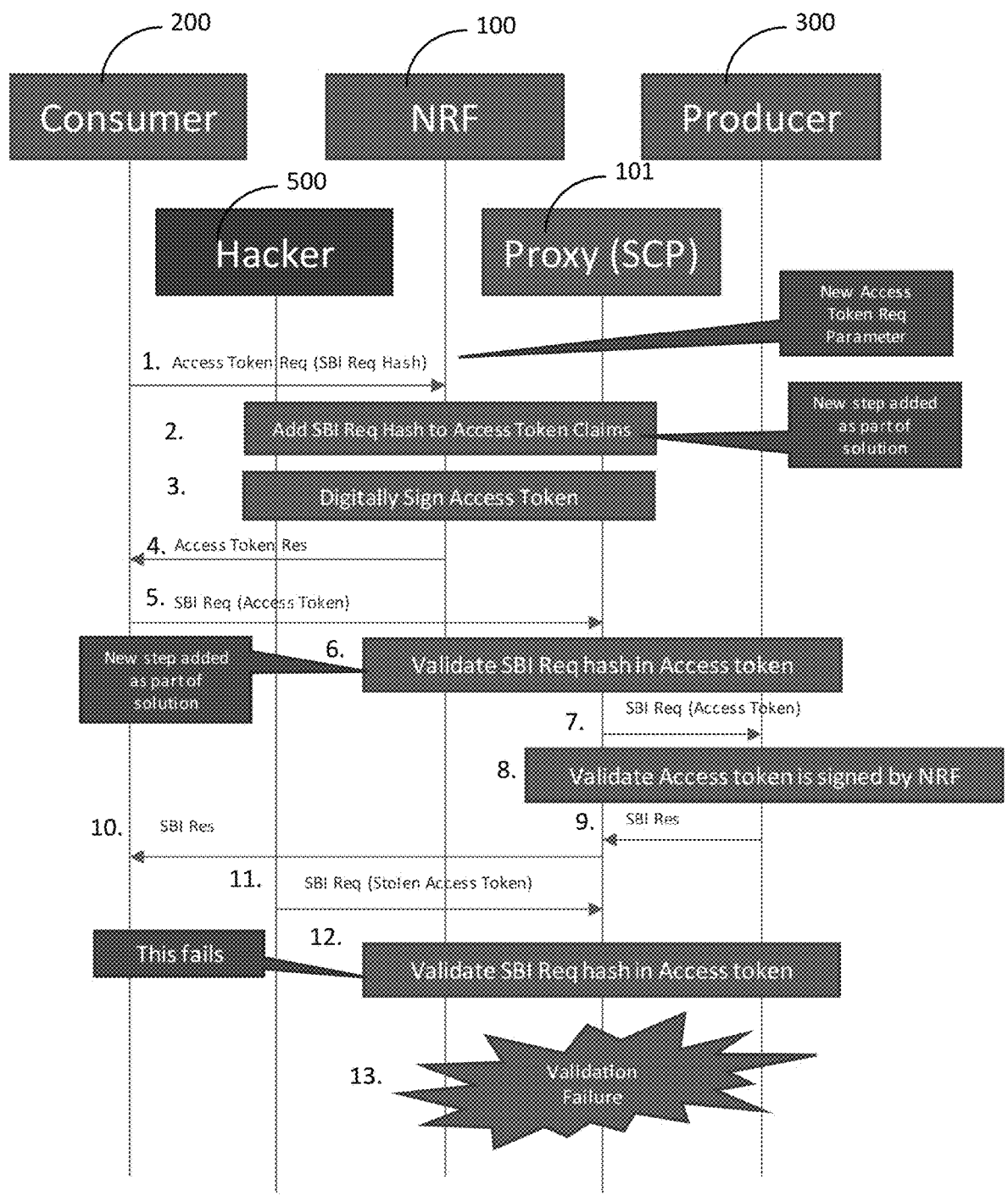
FIG. 7 is a message flow diagram illustrating exemplary messages exchanged for using a single-use OAuth 2.0 access token to secure an SBI service where access token validation is performed at a proxy NF.

In FIG. 6, the single-use access token is used by the producer NF to validate legitimate SBI service requests from consumer NFs and reject illegitimate SBI service requests from hackers. In an alternate implementation, the validation may be performed at a proxy NF, such as an SCP or SEPP. FIG. 7 illustrates the case where access token validation is performed by proxy 101. Referring to FIG. 7, in step 1, consumer NF 200 sends an access token request to NRF 100. The access token request includes a hash of at least a portion of an SBI request message that consumer NF 200 intends to send to a producer NF. The hash may be generated using parameters of the SBI request that are not changed by intermediate nodes so that the hash can be verified by the producer NF. In step 2 of the message flow diagram, NRF 100 receives the access token request and locates, in its NF profile database, an OAuth 2.0 access token corresponding to the producer NF identified in the access token request. NRF 100 adds the hash of the portion of the SBI request message to the access token as a claim. As described above, this is a step that is not performed in conventional OAuth 2.0 access token generation. In step 3, NRF 100 digitally signs the access token, including the hash of the portion of the SBI request message. In step 4 of the message flow diagram, NRF 100 sends an access token response to consumer NF 200. The access token response includes the digitally signed access token, which includes the hash of the SBI request message as a claim.

In step 5 of the message flow diagram, consumer NF 200 sends an SBI request to producer NF 300 via proxy 101. The SBI request includes the access token. In step 6, proxy 101 validates the SBI request hash in the access token. Validating the SBI request hash in the access token may include computing a hash of a portion of the SBI request message and comparing the computed hash to the hash that is included as a claim in the access token. In this example it is assumed that the computed hash matches the hash that is included in the claim of the access token. Accordingly, in step 7, proxy 101 forwards the SBI request to producer NF 300. In step 8, producer NF 300 verifies that the access token is signed by the NRF. In step 9, producer NF 300 sends an SBI response message to consumer NF 200 via proxy 101. In step 10, proxy 101 forwards the SBI response message to consumer NF 200.

In step 11, hacker 500 launches an attack against producer NF 300 using the stolen access token by sending an SBI request with the stolen access token to proxy 101. In step 12, proxy 101 attempts to validate the SBI request hash in the access token. However, because the SBI request parameters used to generate the hash are different from those in the SBI request message generated by hacker 500, the hash computed by proxy 101 does not match the hash stored as a claim in the access token. Accordingly, in step 13, validation fails, and hacker 500 is prevented from accessing the service provided by producer NF 300.

The following is an example of an OAuth 2.0 access token for an AMF including a hash of a portion of an SBI request message.

```
{
  "iss": "6faf1bbc-6e4a-4454-a507-a14ef8e1bc5c",
  "sub": "6faf1bbc-6e4a-4454-a507-a14ef8e1dc5d",
  "aud": [
     "6faf1bbc-6e4a-4454-a507-b14ef8e1bc4c"
  ],
  "scope": "namf-mt",
  "3gppsbireqhash": "SBI Request Hash",
  "exp": 1586169019
}
```

In the example, the OAuth 2.0 access token includes the same claim or parameters as those described above. In addition, the OAuth 2.0 access token includes an SBI request hash, which is a hash of a portion of the SBI request message that the access token is used to validate.

Figure 8:
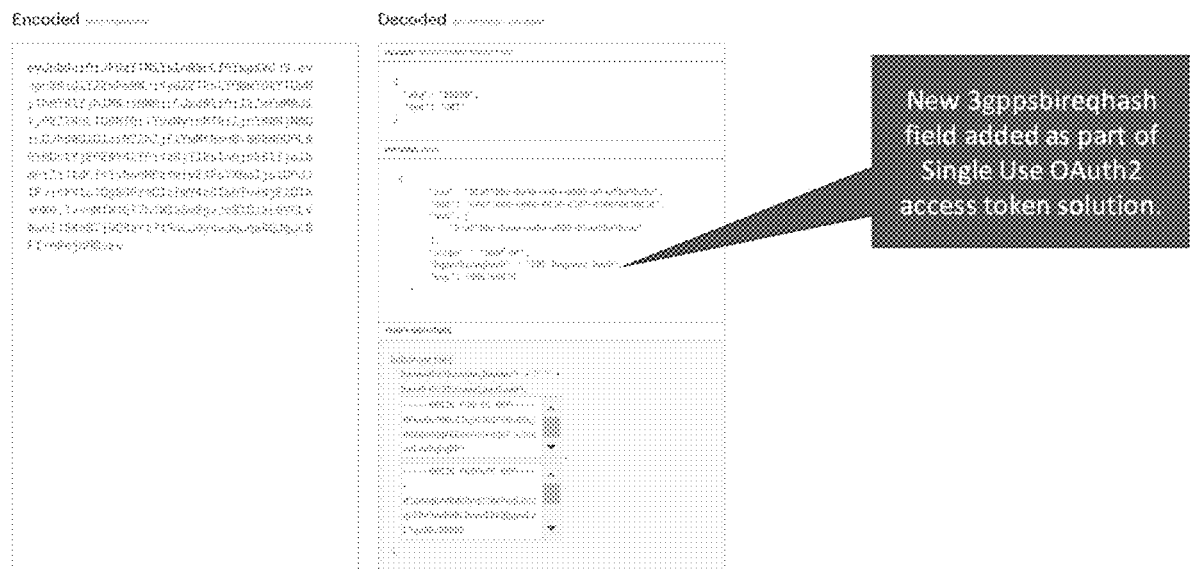
FIG. 8 is a diagram created using the debugger available at https://jwt.io illustrating an example structure for a single-use OAuth 2.0 access token.

FIG. 8 is a diagram illustrating a single-use OAuth 2.0 access token in encoded and decoded format. The example illustrated in FIG. 8 is similar to the example illustrated in FIG. 4. However, as illustrated in FIG. 8 a new SBI request hash field is added as part of the access token, which makes the access token only valid for the request message parameters used to generate the hash. If a hacker uses the access token with a request message with different parameters than those used to create the hash, the message will be rejected because the hash of the request message parameters will not match the hash stored in the access token claim.

As indicated above, the SBI request hash may be generated by selecting HTTP headers and HTTP body attributes of an SBI request which are not allowed to be modified by proxies depending on operator policies. The selected HTTP headers are converted into a JavaScript object notation (JSON) array string. Attributes which are not allowed to be modified by proxies are selected from the JSON body payload. The JSON headers string is concatenated with the JSON body string. The hash is created for the combined string using the same hashing algorithm as used for the OAuth 2.0 access token (or an alternate hashing algorithm selected by the network operator). An example of a simple hash may consider only :method and :path headers of the SBI request and exclude the complete body of the SBI request. This example hash is simple and yet powerful in avoiding a security attack.

Figure 9:
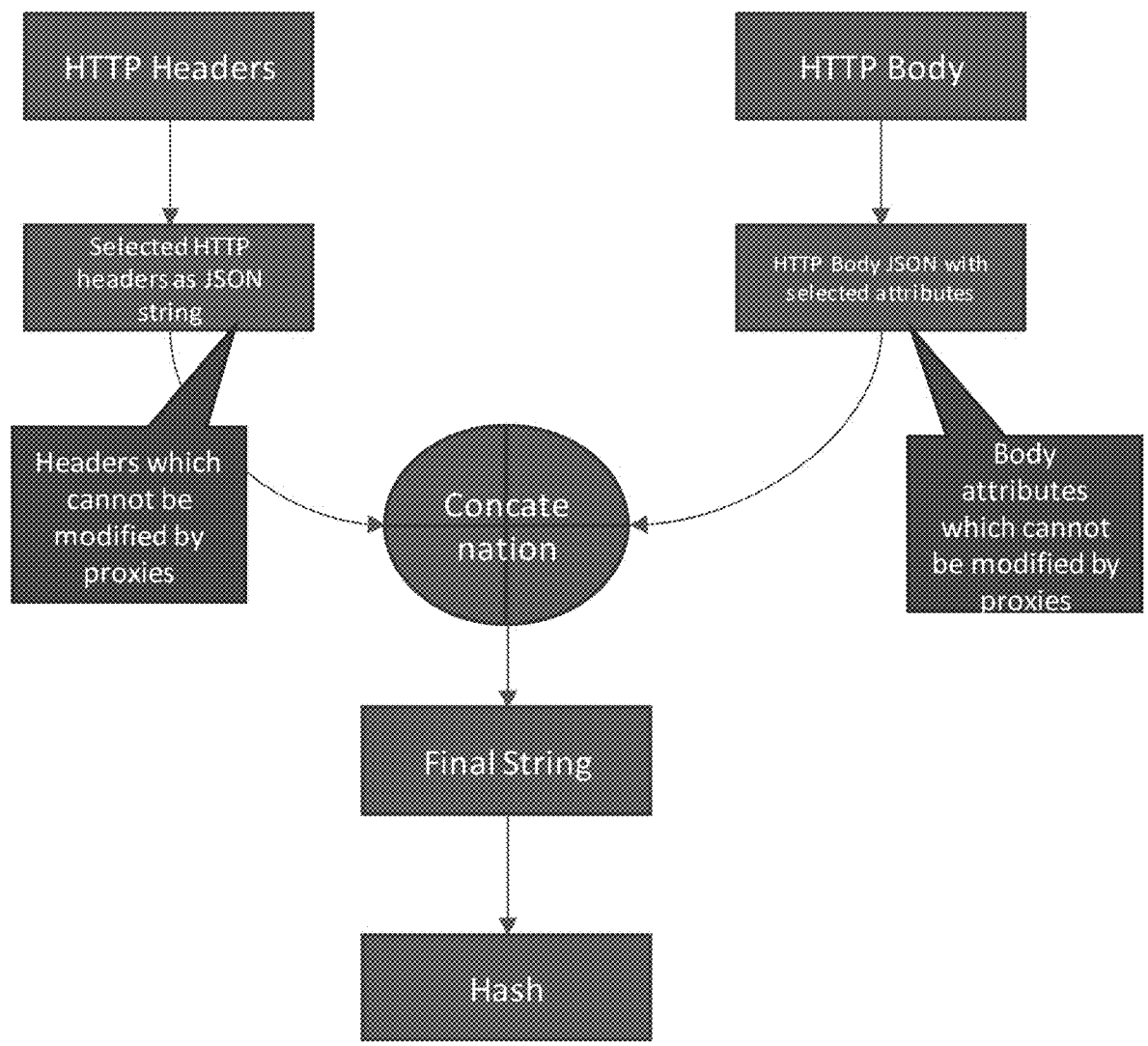
FIG. 9 is a block diagram illustrating an exemplary process for generating a hash of a portion of an SBI request message to be included in a single-use OAuth 2.0 access token.

FIG. 9 is a diagram illustrating an exemplary process for selecting the parameters and generating the hash of the SBI request message. In FIG. 9, the hash can include HTTP headers and HTTP body parameters of an SBI request message. From the HTTP headers, headers that are not allowed to be modified by proxies are selected and concatenated as a JSON string. A similar process is performed for HTTP body parameters. The HTTP header and body parameters are concatenated into a final string. A hash is of the final string is then generated and included as a claim in the OAuth 2.0 access token.

The single-use OAuth 2.0 access token feature can be enabled based on the SBA interface. For some SBA interfaces, an operator may prefer security over performance; whereas for other SBA interfaces, the operator may prefer performance over security. There is always a tradeoff between security and performance. Configuration for single-use OAuth2.0 access token validation is needed on each of consumer NFs, the NRF(s), and producer/proxy NFs. The consumer NF needs to be configured to generate and add the SBI message hash to the OAuth 2.0 access token request sent to the NRF and to add the single-use OAuth 2.0 access token received from the NRF to the SBI request message sent to the producer NF. The NRF needs to be configured to extract the SBI message hash from the access token request, insert the SBI message hash as a claim in the access token, and to send the modified access token to the consumer NF. The producer NF or proxy needs to be configured to validate SBI requests using SBI message hashes. The producer NF or proxy uses parameters in the SBI request message to validate SBI message hash in the OAuth 2.0 access token. Table 2 shown below illustrates example SBA interfaces for which single-use OAuth 2.0 access token validation can be selectively enabled to disabled.

TABLE 2

Example Configuration for Single-use OAuth 2.0 Access Token Validation for Different APIs

| Method | URI | Enabled |
| --- | --- | --- |
| DELETE | /resource1 | YES |
| PUT | /resource1 | YES |
| PATCH | /resource1 | YES |
| ALL | ALL | NO |

As illustrated by the example in Table 2, single-use OAuth 2.0 access token validation is enabled for DELETE, PUT, and PATCH operations on identified resources. However, single-use OAuth 2.0 access token validation is disabled for non-identified resources and service operations. It is understood that single-use OAuth 2.0 access token validation can be selectively enabled or disabled based on any combination of HTTP method, resource URI, or any other suitable parameters of an SBI request message.

Figure 10:
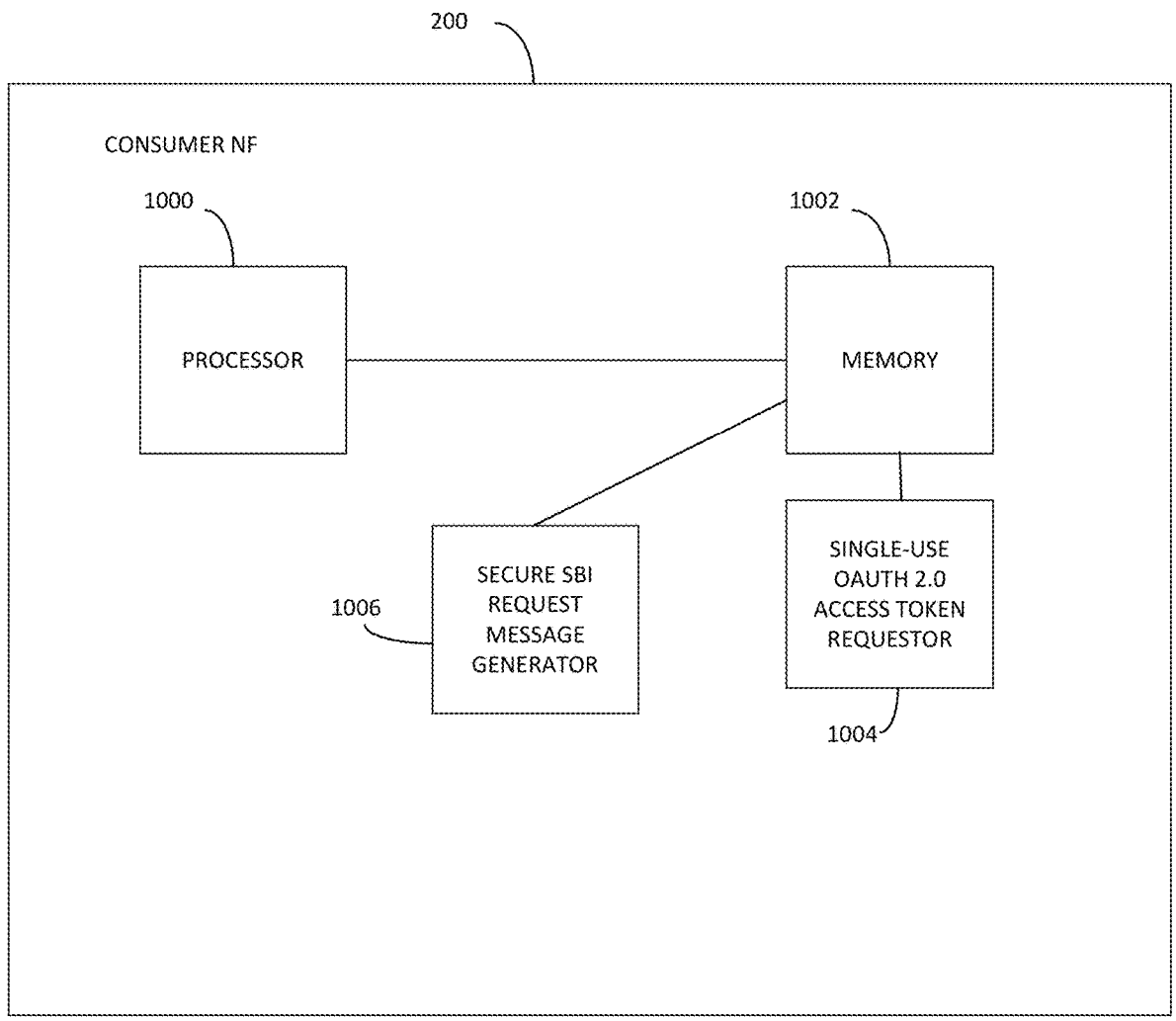
FIG. 10 is a block diagram of a consumer NF for obtaining and using a single-use OAuth 2.0 access token to access an SBI service.

FIG. 10 is a block diagram of a consumer NF 200 for obtaining and using a single-use OAuth 2.0 access token to access an SBI service. Referring to FIG. 10, consumer NF 200 includes at least one processor 1000 and a memory 1002. Consumer NF 200 further includes a single-use OAuth 2.0 access token requestor 1004 for generating an access token request, including, in the access token request, a hash of at least a portion of a service-based interface (SBI) request message, sending the access token request to an NF repository function (NRF), and receiving, from the NRF, an access token response. The access token response has an OAuth 2.0 access token including the hash of the at least a portion of the SBI request message. For example, single-use OAuth 2.0 access token requestor 1004 may be configured to request single-use OAuth 2.0 access tokens for specific types of SBI request messages for which enhanced security is desired. One example of such a configuration is illustrated in Table 2 above. Single-use access token requestor 1004 may also be configured as to which SBI request message parameters to use in computing the hash to be included in the access token request message as well as the hash algorithm to use. As described above, in one example, the message parameters may be selected from those that are not modifiable by a proxy. Any suitable hash algorithm, such as secure hash algorithm (SHA)-256, may be used to generate the hash.

Consumer NF 200 further includes a secure SBI request message generator 1006 for using the OAuth 2.0 access token having the hash of the at least a portion of the SBI request message to access an SBI service. For example, secure SBI request message generator 1006 may formulate an SBI request message, include the single-use OAuth 2.0 access token in the SBI request message, and forward the SBI request message to a producer NF that provides the requested service.

Figure 11:
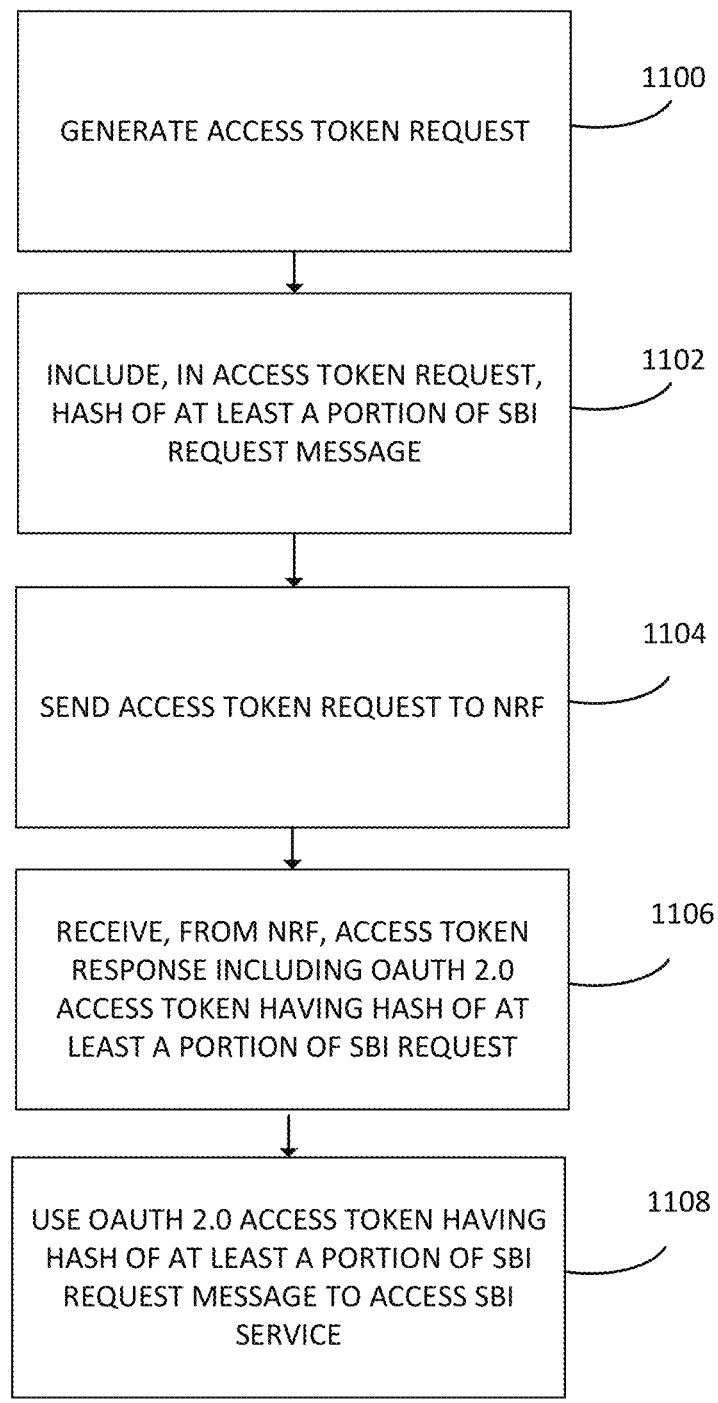
FIG. 11 is a flow chart illustrating an exemplary process performed by a consumer NF for obtaining and using a single-use OAuth 2.0 access token to access a service.

FIG. 11 is a flow chart illustrating an exemplary process performed by a consumer NF for obtaining and using a single-use OAuth 2.0 access token to access a service. Referring to FIG. 11, in step 1100, the process includes generating, by a consumer NF, an access token request. For example, consumer NF 200 may generate an access token request of the format specified in 3GPP TS 33.501 and IETF RFC 6749.

In step 1102, the process comprises including, in the access token request, a hash of at least a portion of an SBI request message. For example, consumer NF 200 may include, in the access token request message, a hash of selected SBI request message parameters of an SBI request for which consumer NF 200 is configured to use single-use OAuth 2.0 access token security when making the request.

In step 1104, the process includes sending the access token request to an NRF. For example, consumer NF 200 may transmit the access token request to NRF 100.

In step 1106, the process includes receiving, from the NRF, an access token response, where the access token response includes the hash of the at least a portion of the SBI request message. For example, consumer NF 200 may receive an access token response from NRF 100, where the access token response includes the hash, as an OAuth 2.0 access token claim, that consumer NF 200 transmitted to NRF 100 in the access token request.

In step 1108, the process includes using the OAuth 2.0 access token including the hash of the at least a portion of the SBI request message to access an SBI service. For example, consumer NF 200 may formulate and send an SBI request message to a producer NF to access a service provided by the producer NF. In the SBI request message, consumer NF 200 may include the OAuth 2.0 access token that includes the hash of the selected parameters of the SBI request message.

Figure 12:
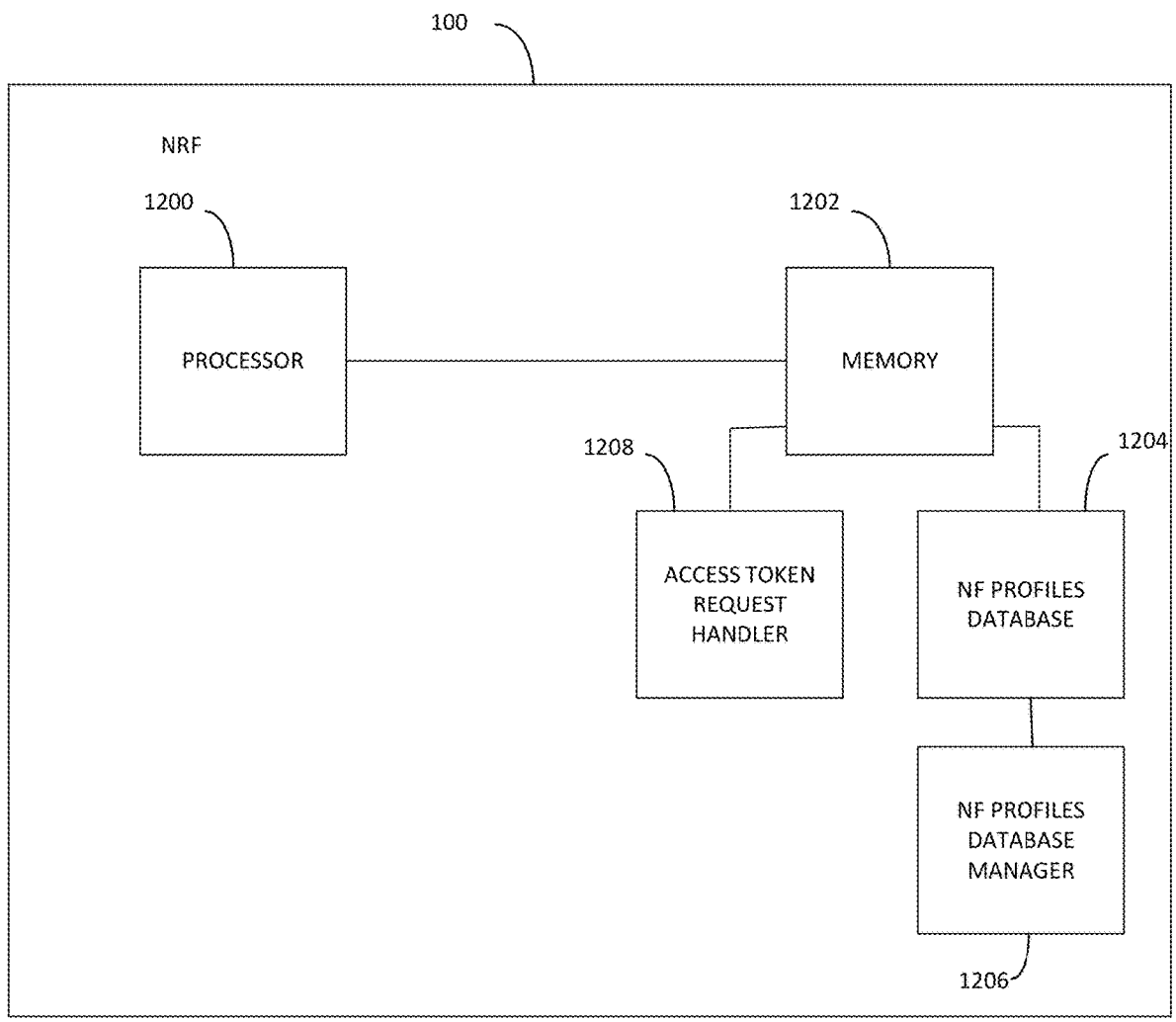
FIG. 12 is a block diagram of an NRF for generating and distributing a single-use OAuth 2.0 access token to secure specific SBA interfaces.

FIG. 12 is a block diagram of an NRF for generating and distributing single-use OAuth 2.0 access tokens to secure specific SBA interfaces. Referring to FIG. 12, NRF 100 includes at least one processor 1200 and memory 1202. NRF 100 further includes an NF profiles database 1204 for storing NF profiles of producer NFs registered with NRF 100. NRF 100 includes an NF profiles database manager 1206 for storing NF profiles in database 1204 in response to NFRegister requests, updating NF profiles in database 1204 in response to NFUpdate requests, and deleting NF profiles from database 1204 in response to NFDeregister requests. NF profiles database manager 1206 may also respond to NF discover requests from consumer NFs using the NF profiles stored in database 1204.

NRF 100 may also include an access token request handler 1208 for receiving access token request messages, generating the corresponding access token response messages, and providing the access response messages to consumer NFs. In one example, access token request handler 1208 may generate and distribute single-use OAuth 2.0 access tokens to consumer NFs. To perform this generation and distribution, access token request handler 1208 may extract a hash of at least a portion of a service-based interface (SBI) request message from an access token request message, generate an access token response message including an OAuth 2.0 access token, include, in the OAuth 2.0 access token, the hash of the at least a portion of the SBI request message, and transmit the access token response to the requestor. Access token request handler 1208 may be implemented using computer executable instructions embodied in memory 1202 and executed by processor 1200.

Figure 13:
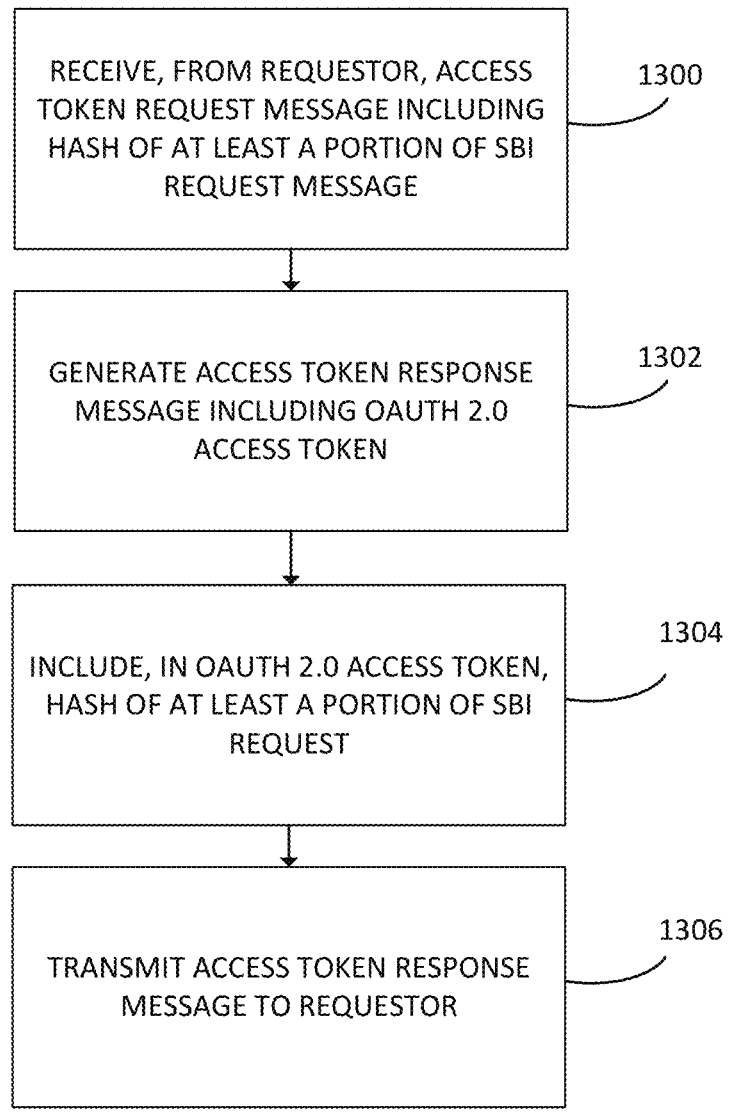
FIG. 13 is a flow chart illustrating an exemplary process performed by an NRF for generating and distributing a single-use OAuth 2.0 access token to secure specific SBA interfaces.

FIG. 13 is a flow chart illustrating an exemplary process performed by an NRF for generating and distributing single-use OAuth 2.0 access tokens to secure specific SBA interfaces. Referring to FIG. 13, in step 1300, the process includes receiving, from a requestor, an access token request message including a hash of at least a portion of a service-based interface (SBI) request message. For example, NRF 100 may receive an access token request from a consumer NF, where the access token request includes a hash of an SBI request message that the consumer NF is configured to secure using a single-use OAuth 2.0 access token.

In step 1302, the process includes generating an access token response message including an OAuth 2.0 access token. For example, NRF 100 may generate an access token response and include, in the access token response, an OAuth 2.0 access token that is usable to access the service identified in the access token request message.

In step 1304, the process includes, including or inserting, in the OAuth 2.0 access token, the hash of the at least a portion of the SBI request message. For example, NRF 100 may extract the hash of the at least a portion of the SBI request message from the access token request message and insert the hash of the at least a portion of the SBI request message as a claim in the OAuth 2.0 access token.

In step 1306, the process includes transmitting the access token response message to the requestor. For example, NRF 100 may transmit the OAuth 2.0 access token to the requesting consumer NF.

Figure 14:
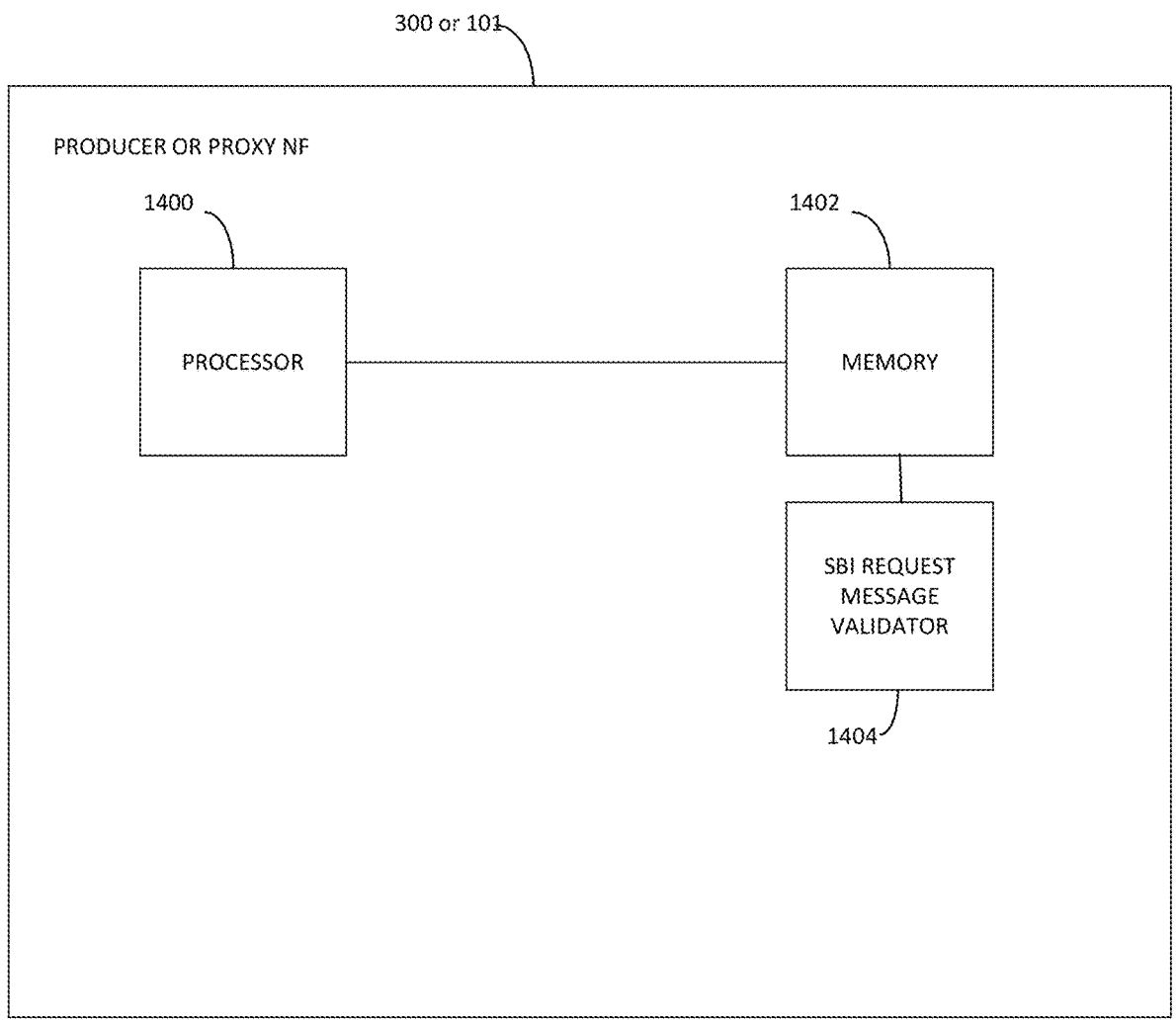
FIG. 14 is a block diagram of a producer or proxy NF for using a single-use OAuth 2.0 access token to secure specific SBA interfaces.

FIG. 14 is a block diagram of a producer or proxy NF for using a single-use OAuth 2.0 access token to secure specific SBA interfaces. Referring to FIG. 14, producer or proxy NF 300 or 101 includes at least one processor 1400 and a memory 1402. Producer or proxy NF 300 or 101 further includes a service-based interface (SBI) request message validator 1404. SBI request message validator 1404 may validate SBI request messages by extracting hashes of portions of the messages from OAuth 2.0 access tokens received with the SBI request messages, computing hashes of the corresponding portions of the messages, comparing the computed hashes to the hashes extracted from the messages and validating or rejecting the messages based on whether the computed hashes match the hashes extracted from the single-use OAuth 2.0 access tokens. The specific SBI messages for which SBI request message validator 1404 performs single-use OAuth 2.0 access token validation may be configured by the network operator along with the SBI message parameters and the hash algorithm that are used to generate the hash. Any suitable hash algorithm may be used. In one example, a secure hash algorithm, such as secure hash algorithm (SHA)-256 may be used to generate the hash. If the computed hash matches the hash extracted from a single-use OAuth 2.0 access token, SBI request message validator 1404 validates the SBI request and provides access to the requested service. If the computed hash does not match the hash extracted from a single-use OAuth 2.0 access token, SBI request message validator 1404 rejects the SBI request and prevents the requestor from accessing the service. SBI request message validator 1404 may be implemented using computer executable instructions embodied in memory 1402 and executed by processor 1400.

Figure 15:
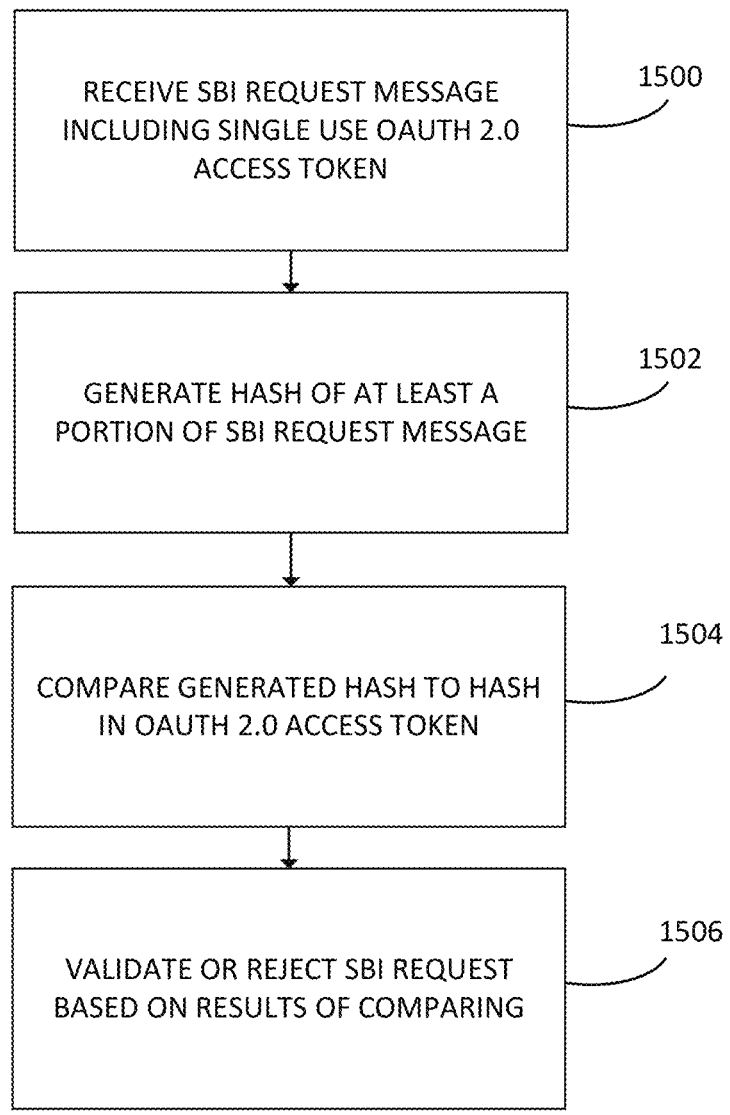
FIG. 15 is a flow chart illustrating an exemplary process performed by a producer or proxy NF for using a single-use OAuth 2.0 access token to secure specific SBA interfaces.

FIG. 15 is a flow chart illustrating an exemplary process implemented by a producer or proxy NF for securing specific SBA interfaces using single-use OAuth 2.0 access tokens. Referring to FIG. 15, in step 1500, the process includes receiving an SBI request message including a single-use OAuth 2.0 access token. For example, producer or proxy NF 300 or 101 may receive an SBI request for accessing a service, where the SBI request includes a single-use OAuth 2.0 access token formatted as described herein and including a hash of at least a portion of the SBI request message.

In step 1502, the process includes generating a hash of at least a portion of the SBI request message. For example producer or proxy NF 300 or 101 may generate a hash of predetermined parameters of the SBI request message, where the parameters and hash algorithm used are configured by the network operator.

In step 1504, the process includes comparing the hash of the at least a portion of the SBI request message generated by the producer or proxy NF with the hash of the at least a portion of the SBI request message included in the OAuth 2.0 access token. For example, producer or proxy NF 300 or 101 may compare the computed hash to the hash included in the OAuth 2.0 access token received in the SBI request message.

In step 1506, the process includes validating or rejecting the SBI request message based on results of the comparing. For example, producer or proxy NF 300 or 101 may validate the request and allow access to the service if the computed hash matches the hash in the OAuth 2.0 access token. Producer or proxy NF 300 or 101 may reject the SBI request and prevent access to the service if the computed hash does not match the hash in the OAuth 2.0 access token.

The following are exemplary advantages of the subject matter described herein:
- Single-use OAuth 2.0 access token validation can prevent security attacks that attempt to use stolen OAuth 2.0 access tokens. This is important because a security attack can cause a complete network outage.
- The solution can be enabled on selected 5G SBA interfaces, providing the benefits of both enhanced security and performance.
- If implemented on the SCP or SEPP, single-use OAuth 2.0 access token validation provides an advantage of centralized configuration, versus configuring the feature on all or even a subset of producer NFs.
- Single-use OAuth 2.0 access token validation is extensible to both intra PLMN and inter PLMN messages.
- Single-use OAuth 2.0 access token validation can be implemented on the SCP, SEPP, and/or on producer NFs.
- Examples of NFs on which single-use OAuth 2.0 access token validation include the SCP, NRF, NSSF, PCF, binding support function (BSF), unified data repository (UDR), NEF, SEPP, or any of the other NFs illustrated in FIG. 1.

The disclosure of each of the following references is hereby incorporated herein by reference in its entirety.

REFERENCES 1. 3$^{rd}$ Generation Partnership Project; Technical Specification Group Services and System Aspects; System architecture for the 5G System (5GS); Stage 2 (Release 17) 3GPP TS 23.501 V17.0.0 (2021-03).

2. 3rd Generation Partnership Project; Technical Specification Group Core Network and Terminals; 5G System; Network Function Repository Services; Stage 3 (Release 17) 3GPP TS 29.510 V17.0.0 (2020-12).

3. Hardt, "The OAuth 2.0 Authorization Framework," IETF RFC 6749 (October 2012).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for obtaining and using a single-use OAuth 2.0 access token for securing specific service-based architecture (SBA) interfaces, the method comprising:
generating, by a consumer network function (NF), an access token request;
selecting, by the consumer NF, hypertext transfer protocol (HTTP) headers of a service-based interface (SBI) request message which are not allowed to be modified by proxies, where the SBI request message is a different message from the access token request;
including, in the access token request, a hash of the selected HTTP headers of the SBI request message which are not allowed to be modified by proxies;
sending the access token request to an NF repository function (NRF);
receiving, from the NRF, an access token response, the access token response having an OAuth 2.0 access token including the hash of the selected HTTP headers of the SBI request message which are not allowed to be modified by proxies; and
using the OAuth 2.0 access token including the hash of the selected HTTP headers of the SBI request message which are not allowed to be modified by proxies to access an SBI service.

2. The method of claim 1 wherein including the hash of the selected HTTP headers of the SBI request message which are not allowed to be modified by proxies in the access token request includes adding the hash of the selected HTTP headers of the SBI request message which are not allowed to be modified by proxies as a custom HTTP header or a vendor-specific information element (IE) in a JavaScript object notation (JSON) body of the access token request.

3. The method of claim 1 wherein receiving the access token response having the OAuth 2.0 access token including the hash of the at selected HTTP headers of the SBI request message which are not allowed to be modified by proxies includes receiving the access token response with the hash of the selected HTTP headers of the SBI request message which are not allowed to be modified by proxies as a claim of the OAuth 2.0 access token.

4. The method of claim 1 wherein using the OAuth 2.0 access token including the hash of the selected HTTP headers of the SBI request message which are not allowed to be modified by proxies to access the SBI service includes transmitting the SBI request message with the OAuth 2.0 access token including the hash of the selected HTTP headers of the SBI request message which are not allowed to be modified by proxies to a producer NF.

5. The method of claim 4 wherein transmitting the SBI request message with the OAuth 2.0 access token including the hash of the selected HTTP headers of the SBI request message which are not allowed to be modified by proxies to the producer NF includes transmitting the SBI request message to the producer NF via a proxy NF.

6. The method of claim 5 comprising, at the proxy NF, receiving the SBI request message, generating a hash of the selected HTTP headers of the SBI request message which are not allowed to be modified by proxies, comparing the hash of the selected HTTP headers of the SBI request message which are not allowed to be modified by proxies generated by the proxy NF with the hash of the selected HTTP headers of the SBI request message which are not allowed to be modified by proxies included in the OAuth 2.0 access token and validating or rejecting the SBI request message based on results of the comparing.

7. The method of claim 6 wherein the proxy NF comprises one of a service communication proxy (SCP) and a security edge protection proxy (SEPP).

8. The method of claim 4 comprising, at the producer NF, receiving the SBI request message, generating a hash of the selected HTTP headers of the SBI request message which are not allowed to be modified by proxies, comparing the hash of the selected HTTP headers of the SBI request which are not allowed to be modified by proxies generated by the producer NF with the hash of the selected HTTP headers of the SBI request message which are not allowed to be modified by proxies included in the OAuth 2.0 access token and validating or rejecting the SBI request message based on results of the comparing.

9. A system for obtaining and using a single-use OAuth 2.0 access token for securing specific service-based architecture (SBA) interfaces, the system comprising:
a consumer network function (NF) including at least one processor;
a single-use OAuth 2.0 access token requestor implemented by the at least one processor for generating an access token request, selecting, by the consumer NF, hypertext transfer protocol (HTTP) headers of a service-based interface (SBI) request message which are not allowed to be modified by proxies, where the SBI request message is a different message from the access token request, including, in the access token request, a hash of the selected HTTP headers of the SBI request message, sending the access token request to an NF repository function (NRF), and receiving, from the NRF, an access token response, the access token response having an OAuth 2.0 access token including the hash of the selected HTTP headers of the SBI request message; and
a secure SBI request message generator implemented by the at least one processor for using the OAuth 2.0 access token including the hash of the selected HTTP headers of the SBI request message to access an SBI service.

10. The system of claim 9 wherein the single-use OAuth 2.0 access token requestor is configured to add the hash of the selected HTTP headers of the SBI request message as a custom HTTP header or a vendor-specific information element (IE) in a JavaScript object notation (JSON) body of the access token request.

11. The system of claim 9 wherein the single-use OAuth 2.0 access token requestor is configured to receive the access token response with the hash of the selected HTTP headers of the SBI request message as a claim of the OAuth 2.0 access token.

12. The system of claim 9 wherein the secure SBI request message generator is configured to use the OAuth 2.0 access including the hash of the selected HTTP headers of the SBI request message to access the service by transmitting the SBI request message with the OAuth 2.0 access token including the hash of the selected HTTP headers of the SBI request message to a producer NF.

13. The system of claim 12 comprising a proxy NF, wherein the SBI request message generator is configured to transmit the SBI request message with the OAuth 2.0 access token including the hash of the selected HTTP headers of the SBI request message to the producer NF via the proxy NF.

14. The system of claim 13 wherein the proxy NF is configured to receive the SBI request message, generate a hash of the selected HTTP headers of the SBI request message, compare the hash of the selected HTTP headers of the SBI request message generated by the proxy NF with the hash of the selected HTTP headers of the SBI request message included in the OAuth 2.0 access token and validate or reject the SBI request message based on results of the comparing.

15. The system of claim 14 wherein the proxy NF comprises one of a service communication proxy (SCP) or a security edge protection proxy (SEPP).

16. The system of claim 9 comprising a producer NF, wherein the SBI request message generator is configured to use the OAuth 2.0 access token including the hash of the selected HTTP headers of the SBI request message to access an SBI service by transmitting the SBI request message to the producer NF and wherein the producer NF is configured to receive the SBI request message, generate a hash of the selected HTTP headers of the SBI request message, compare the hash of the selected HTTP headers of the SBI request message generated by the producer NF with the hash of the selected HTTP headers of the SBI request message included in the OAuth 2.0 access token and validate or reject the SBI request message based on results of the comparing.

17. A system for generating and distributing a single-use OAuth 2.0 access token for securing specific service-based architecture (SBA) interfaces, the system comprising:

a network function (NF) repository function (NRF) including at least one processor; and an access token request handler implemented by the at least one processor for receiving, from a requestor, an access token request message including a hash of selected hypertext transfer protocol (HTTP) headers of a service based interface (SBI) request message which are not allowed to be modified by proxies, where the SBI request message is a different message from the access token request, generating an access token response message including an OAuth 2.0 access token, including, in the OAuth 2.0 access token, the hash of the selected HTTP headers of the SBI request message, and transmitting the access token response message to the requestor.

18. A system for using a single-use OAuth 2.0 access token to secure specific service-based architecture (SBA) interfaces, the system comprising:

a network function (NF) including at least one processor;

a service-based interface (SBI) request message validator implemented by the at least one processor for receiving an SBI request message including an OAuth2.0 access token having a hash of selected hypertext transfer protocol (HTTP) headers of the SBI request message which are not allowed to be modified by proxies, generating a hash of the selected HTTP headers of the SBI request message, comparing the hash of the selected HTTP headers of the SBI request message generated by the NF to the SBI request message hash included in the OAuth 2.0 access token and validating or rejecting the SBI request message based on results of the comparing.

19. The system of claim 18 wherein the NF comprises a proxy NF.

20. The system of claim 18 wherein the NF comprises a producer NF.

* * * * *